United States Patent
Schikora et al.

(10) Patent No.: US 11,295,273 B2
(45) Date of Patent: Apr. 5, 2022

(54) NORMALIZED OBJECT EXPOSURE FOR COLLABORATIVE PLATFORMS

(71) Applicant: SAP SE, Walldorf (DE)

(72) Inventors: Dave Schikora, Berlin (DE); Ole Lilienthal, Werder (DE); Michael Burwig, Berlin (DE); Pit Humke, Potsdam (DE); Leif Jensen-Pistorius, Oestringen (DE); Peer Hilgers, Grasellenbach (DE); Martin Wezowski, Berlin (DE); Thomas Spangemacher, Neulussheim (DE)

(73) Assignee: SAP SE, Walldorf (DE)

( * ) Notice: Subject to any disclaimer, the term of this patent is extended or adjusted under 35 U.S.C. 154(b) by 909 days.

(21) Appl. No.: 15/155,416

(22) Filed: May 16, 2016

(65) Prior Publication Data
US 2017/0330151 A1    Nov. 16, 2017

(51) Int. Cl.
| | | |
|---|---|---|
| G06F 3/00 | (2006.01) | |
| G06F 9/00 | (2006.01) | |
| G06F 17/00 | (2019.01) | |
| G06Q 10/10 | (2012.01) | |
| G06F 16/25 | (2019.01) | |

(52) U.S. Cl.
CPC ......... *G06Q 10/103* (2013.01); *G06F 16/258* (2019.01)

(58) Field of Classification Search
CPC ................. G06Q 10/103; G06F 17/30569
See application file for complete search history.

(56) References Cited

U.S. PATENT DOCUMENTS

| | | |
|---|---|---|
| 6,301,584 B1 | 10/2001 | Ranger |
| 6,505,228 B1 | 1/2003 | Schoening et al. |
| 6,973,460 B1 | 12/2005 | Mitra |
| 7,340,718 B2 | 3/2008 | Szladovics et al. |
| 7,403,989 B2 | 7/2008 | Beringer et al. |
| D582,923 S | 12/2008 | Blankenship et al. |
| D582,924 S | 12/2008 | Blankenship et al. |
| D582,925 S | 12/2008 | Blankenship et al. |
| D582,926 S | 12/2008 | Blankenship et al. |
| D582,927 S | 12/2008 | Blankenship et al. |
| D582,928 S | 12/2008 | Blankenship et al. |

(Continued)

OTHER PUBLICATIONS

U.S. Appl. No. 15/155,683, filed May 16, 2016, Schikora, et al.

(Continued)

*Primary Examiner* — Kieu D Vu
*Assistant Examiner* — Anita D Chaudhuri
(74) *Attorney, Agent, or Firm* — Fish & Richardson P.C.

(57) ABSTRACT

Techniques are described for providing normalized object exposure in a collaborative platform. Implementations provide a collaborative platform to enable multiple users to collaborate to address an issue collectively. The platform enables a user to create a work routine in which objects may be added and manipulated by multiple users. The objects may be normalized through use of a normalized object contract. Tools may be added to the work routine, and linked to objects to apply functionality to the object data of the objects. The tools may also comply with the normalized object contract to be consumable within the platform. Through the contract, objects may exhibit a shared common state such that multiple users and/or processes access the same state for a particular object at any given time in a work routine.

20 Claims, 11 Drawing Sheets

(56) References Cited

U.S. PATENT DOCUMENTS

| | | | |
|---|---|---|---|
| D582,929 S | 12/2008 | Blankenship et al. | |
| D582,930 S | 12/2008 | Blankenship et al. | |
| D582,931 S | 12/2008 | Blankenship et al. | |
| D582,932 S | 12/2008 | Blankenship et al. | |
| D589,967 S | 4/2009 | Blankenship et al. | |
| D592,218 S | 5/2009 | Blankenship et al. | |
| D592,224 S | 5/2009 | Blankenship et al. | |
| D592,225 S | 5/2009 | Blankenship et al. | |
| 7,565,364 B1 | 7/2009 | Darcy et al. | |
| 8,191,001 B2 | 5/2012 | Van Wie et al. | |
| 8,484,259 B1 | 7/2013 | Makkar et al. | |
| 8,621,421 B2 | 12/2013 | Klaka et al. | |
| 8,731,982 B2 | 5/2014 | Morrison et al. | |
| 8,819,629 B2 | 8/2014 | Sherrill et al. | |
| 8,887,087 B2 | 11/2014 | Hilgers et al. | |
| 8,887,154 B2 | 11/2014 | Eksten et al. | |
| 9,043,747 B2 | 5/2015 | Eksten et al. | |
| 9,182,949 B2 | 11/2015 | Eksten et al. | |
| 9,348,563 B1 | 5/2016 | Xue et al. | |
| 9,395,959 B2 | 7/2016 | Hatfield et al. | |
| 9,495,208 B2 | 11/2016 | Moulden et al. | |
| 10,078,818 B2 | 9/2018 | Schikora et al. | |
| 2004/0223009 A1 | 11/2004 | Szladovics et al. | |
| 2004/0236655 A1* | 11/2004 | Scumniotales | G06Q 10/0637 705/36 R |
| 2005/0114243 A1* | 5/2005 | Scumniotales | G06Q 10/10 705/35 |
| 2005/0171980 A1 | 8/2005 | Fernandez et al. | |
| 2006/0179035 A1* | 8/2006 | Broker | G06F 17/30973 |
| 2007/0143736 A1 | 6/2007 | Moriarty et al. | |
| 2007/0203923 A1 | 8/2007 | Thomas | |
| 2007/0220022 A1 | 9/2007 | Lankinen et al. | |
| 2007/0226203 A1 | 9/2007 | Adya et al. | |
| 2008/0126980 A1 | 5/2008 | Bachmann et al. | |
| 2008/0244399 A1 | 10/2008 | Hilgers et al. | |
| 2008/0244423 A1 | 10/2008 | Jensen-Pistorius et al. | |
| 2009/0055410 A1 | 2/2009 | Colgrave et al. | |
| 2011/0077958 A1* | 3/2011 | Breitenstein | G06Q 10/10 705/2 |
| 2011/0088011 A1 | 4/2011 | Ouali et al. | |
| 2012/0227044 A1 | 9/2012 | Arumugham et al. | |
| 2013/0006968 A1 | 1/2013 | Gusmini et al. | |
| 2013/0061155 A1 | 3/2013 | Hon et al. | |
| 2013/0218933 A1 | 8/2013 | Ismailov et al. | |
| 2013/0346444 A1 | 12/2013 | Makkar et al. | |
| 2014/0130012 A1 | 5/2014 | Weatherhead et al. | |
| 2014/0280494 A1 | 9/2014 | Samoyienko et al. | |
| 2014/0372974 A1 | 12/2014 | Welicki et al. | |
| 2015/0081629 A1 | 3/2015 | Newman et al. | |
| 2015/0142855 A1 | 5/2015 | Fast et al. | |
| 2015/0309769 A1 | 10/2015 | Greene et al. | |
| 2017/0076256 A1 | 3/2017 | Castel et al. | |
| 2017/0293472 A1 | 10/2017 | Catania et al. | |
| 2017/0329461 A1 | 11/2017 | Schikora et al. | |
| 2017/0329498 A1 | 11/2017 | Schikora et al. | |
| 2017/0364386 A1 | 12/2017 | Khot et al. | |

OTHER PUBLICATIONS

U.S. Appl. No. 15/155,621, filed May 16, 2016, Schikora, et al.
U.S. Appl. No. 15/384,626, filed Dec. 20, 2016, Schikora, et al.
Microsoft GigJam, It's you gig. Work the way you want; https://www.microsoft.com/gigjam/; 5 pages; [uploaded from internet on Dec. 13, 2016].
Google, Search Google Docs editors Help; https://support.google.com/docs/answer/2494822; 3 pages; [printed from internet Dec. 13, 2016].
Zhou Liandong, Integrated Collaborative manufacturing Management System for Complex Product, 2009, pp. 206-209. https://ieeexplore.ieee.org/stannp/stannp.jsp?tp=&arnunnber=5380962 (Year: 2009).
Qishi Wu, Automation and Management of Scientific Workflows in Distributed Network Environments, 2010, pp. 1-8. https://ieeexplore.ieee.org/stannp/stannp.jsp?tp=&arnunnber=5380962 (Year: 2010).
Michael Zeising, Towards a Common Platform for the Support of Routine and Agile Business Processes, 2014, pp. 94-102. https://ieeexplore.ieee.org/stannp/stannp.jsp?arnunnber=7014554 (Year: 2014).
Stefan Schonig, Supporting Collaborative Work by Learning Process Models and Patterns from Cases, 2013, pp. 60-69. https://ieeexplore.ieee.org/stannp/stannp.jsp?tp=&arnunnber=6679970 (Year: 2013).
Non-Final Office Action for related application for U.S. Appl. No. 15/155,683 dated Aug. 28, 2018; 12 pages.
Non-Final Office Action for related application for U.S. Appl. No. 15/155,621 dated Jun. 20, 2018; 22 pages.
Non-Final Office Action for related application for U.S. Appl. No. 15/384,626 dated Nov. 15, 2017; 22 pages.
Final Office Action for related application for U.S. Appl. No. 15/155,683 dated Mar. 7, 2019, 13 pages.
Non-Final Office Action issued in U.S. Appl. No. 15/155,683 dated May 30, 2019, 14 pages.

* cited by examiner

NORMALIZED OBJECT EXPOSURE FOR COLLABORATIVE PLATFORMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

An organization may employ various computing systems, including hardware and software components, to conduct activities associated with the organization. Traditionally, such systems are configured to support an activity in a static, not readily configurable manner. For example, particular activities may be coded into the logic of the software executed by a computing system, and may not readily be altered without extensive recoding. Individuals within the organization may act as data providers to feed information into systems. However, traditional systems may lack flexibility to enable different individuals to approach an organizational activity differently, given the static configuration of the systems.

SUMMARY

Implementations of the present disclosure are generally directed to platform for multi-user collaboration. More specifically, implementations are directed to providing normalized object exposure within a collaborative platform and/or other environments.

In general, innovative aspects of the subject matter described in this specification can be embodied in methods that includes actions of: determining one or more normalized data objects for consumption in an application executed by the at least one processor, the one or more normalized data objects complying with a normalized object contract that at least specifies one or more perspectives supported by the one or more normalized data objects, each of the one or more perspectives providing access to a set of data attributes of the one or more normalized data objects; determining a perspective of the one or more perspectives supported by the one or more normalized data objects; and employing the perspective to present, in a user interface (UI) of the application, the set of data attributes that correspond to the perspective for the one or more normalized data objects.

Implementations can optionally include one or more of the following features: the one or more perspectives include one or more of a HeaderInfo perspective, an Identification perspective, a LineItem perspective, and a SearchScope perspective; the normalized object contract further specifies that the one or more normalized data objects each includes a self-reference that comprises an instance key and a path to an object type; the normalized object contract further specifies that the one or more normalized data objects each provide a shared common state to a plurality of accessors; the normalized object contract further specifies that the one or more normalized data objects each have a type; each of the one or more normalized data objects support one or more other perspectives according to the type; and/or the actions further include in response to a change in at least one of the set of data attributes, dynamically updating the presentation of the set of data attributes in the UI.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Using traditional systems, if users wish to collaborate on an activity they may do so by creating spreadsheets or other documents that include the relevant information, creating slide presentations that include the information, attaching the documents and/or presentations to emails or social network messages, and/or incorporating the information directly into the emails or social network messages. In this way, users may collaborate to determine and evaluate plans and/or alternatives, draw conclusions, reach consensus, make strategic decisions, and so forth. However, this style of collaboration using traditional systems has many drawbacks. For example, information may be omitted, lost, and/or distorted through various iterations of copying and pasting. Poor decisions may result from such an ad hoc collaboration style. Such a collaboration may waste time through repeated emails or other communications. The work routines may not be captured and documented in the system, making it difficult to trace the history of a collaboration or roll back to a prior information state. To obviate or eliminate these issues present in traditional systems, implementations provide a collaborative platform to enable multiple users within an organization to collaborate to address an issue, plan a process, solve a problem, and/or perform some other activity.

Moreover, traditional systems may dictate the relationship between the issue and its solution, by providing only one or a predetermined limited number of ways to solve a particular problem. In contrast to this traditional approach, implementations provide a platform that supports the use of different approaches or styles among different users by enabling users to structure and resolve an issue according to their (e.g., personal) work route. The platform does not dictate a particular solution or process to reach a solution, as may be dictated by traditional systems. Moreover, implementations decompose functionality and artifacts to make functionality and artifacts readily consumable within a work routine, enabling issue resolution that is adaptable to particular user styles.

Further, in traditional systems data binding may be performed for each type of object that may be touched during execution of an application, as described further below. For example, one object might expose the two fields "First Name" and "Last Name" whereas a similar, yet different object might have "First Name" and "Family Name". The semantic mapping of fields to the frontend application may consume a significant portion of the overall development cost of a project in a traditional software development setting. By employing renderers to facilitate data binding at runtime, implementations avoid the use of development time, personnel, and resources consumed in traditional settings that use more rigid data binding The renderers as described herein may also provide reusability benefits. For example, in an approval work flow the approve and/or decline steps may be similar across different use cases or scenarios. To interact with the approval work flow, a may look at attributes of an object and approve or decline the request associated with the object. With the reusable renderers provided by implementations, such a screen would only be needed to be implemented once and could then be reused for any use case that involves an approval step.

As another advantage, implementations enable data binding to be changed at runtime without the need to alter application code. This can be achieved through a (e.g., web-based) annotations editor that enables an administrator to modify the annotations that define the mapping from source data onto objects.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
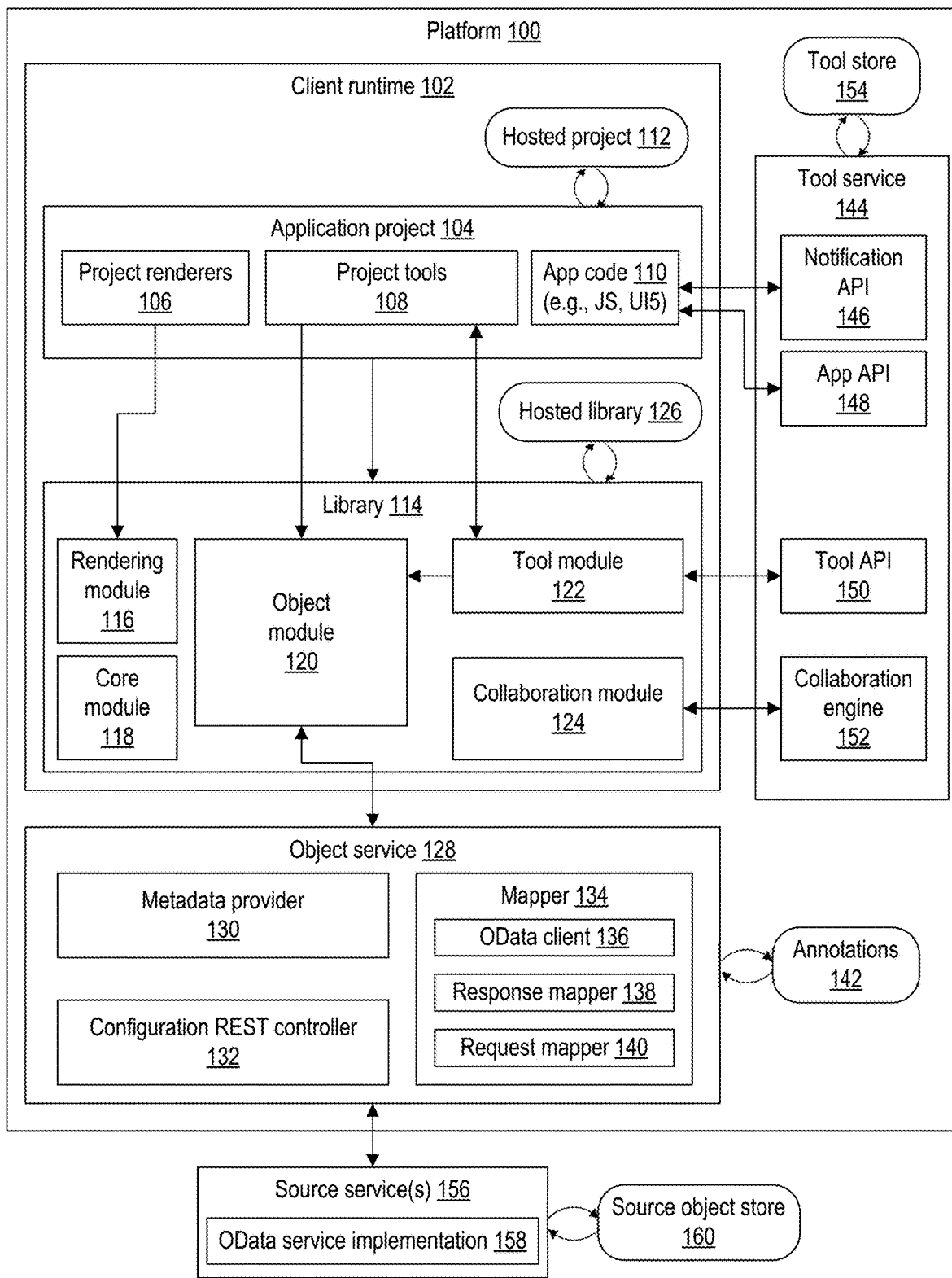
FIG. 1 depicts an example system for a collaborative platform, according to implementations of the present disclosure.

Implementations of the present disclosure are directed to systems, devices, methods, and computer-readable media for providing normalized object exposure in a collaborative platform. Implementations provide a collaborative platform to enable multiple users within an organization to collaborate to address an issue collectively—e.g., plan a process, solve a problem, and/or perform some other activity. The platform enables a user to create a work routine in which objects may be added and manipulated by multiple users. The objects may be normalized through use of a normalized object contract. Tools may be added to the work routine, and linked to objects to apply functionality to the object data of the objects. The tools may also comply with the normalized object contract to be consumable within the platform. Through the contract, objects may exhibit a shared common state, such that multiple users and/or processes access the same state for a particular object at any given time. Accordingly, the contract facilitates collaboration through the framework, by ensuring that multiple users can view a current state of the objects included in a work routine, and by ensuring that the object state is dynamically updated for all accessors (e.g., users and/or accessing applications or processes) in response to changes made to the object by a particular user or tool in the framework.

Implementations also provide for polymorph rendering of objects, in which the same object is presented differently in the UI depending on which perspective is being used to render the object. In some implementations, the platform supports multiple renderers and each renderer is associated with a particular perspective. Polymorph rendering may also be described as adaptive rendering, given that the presentation of an object may be adapted to the particular needs of the users accessing the WR, and such adaptation is achieved through use of different renderers to render the object according to different perspectives. A particular renderer can be written once and added to the platform, and that renderer may be applied to a variety of objects. Tools may also be rendered according to various perspectives, given that tools also support the normalized object contract and at least expose the mandatory perspectives.

In some implementations, the platform may access data objects from any suitable number of source services. In some implementations, the source services may provide data according to a version of the Open Data Protocol (OData). The data model of the platform may be dependent on the data models of its associated (e.g., OData) source services as well as source service annotations, where such annotations describe the mapping onto the various data model elements. The process of mapping requests and results between the platform and the external (e.g., OData) data sources at runtime may employ an efficient schema mapping data structure to minimize the potential performance impacts. Implementations may employ a hierarchical class structure that is configured to achieve efficient traversal by shifting some or most of the computational load to initialization time when the source service data models and annotations are processed. The initialization of this structure may be triggered at initialization time of the platform or whenever an administrative action causes changes to the schema mapping.

Traditionally, computing systems used in an organization (e.g., a business) are configured to be most relevant to (e.g., target) the organization as a whole instead of the individuals within the organization. Individuals may act as data providers, or data consumers, but may have little control over the way in which traditional computing systems manage processes. Nevertheless, the individuals still are tasked to solve problems, resolve incidents, find solutions, and collaborate with others using the traditional systems available. Each individual has their own personal way to conduct these activities, and traditional computing systems may lack qualitative user support for this kind of work. In some instances there may be no user support at all.

Using traditional systems, if users wish to collaborate on an activity they may do so by creating spreadsheets or other documents that include the relevant information, creating presentations that include the information, attaching the documents and/or presentations to emails or social network messages, or incorporating the information directly into the emails or social network messages. In this way, users may collaborate to determine and evaluate plans and/or alternatives, draw conclusions, reach consensus, make strategic decisions, and so forth. However, this style of collaboration using traditional systems has many drawbacks. For example, information may be omitted, lost, and/or distorted through various iterations of copying and pasting. Poor decisions may result from such an ad hoc collaboration style. Such a collaboration may waste time through repeated emails or other communications. The work routines may not be captured and documented in the system, making it difficult to trace the history of a collaboration or roll back to a prior information state. To obviate or eliminate these issues present in traditional systems, implementations provide a collaborative platform to enable multiple users within an organization to collaborate to plan a process, solve a problem, or perform some other activity.

In some implementations, the platform supports a work routine (WR). In some instances, the WR may be associated with an activity performed within an organization, such as a problem to be solved, issue to be resolved, activity to be planned and/or executed, and so forth. The work routine may also be described as a personal work routine, given that a WR may be associated with and accessed by one or more particular users through the platform. In some implementations, a WR is a container that expresses an issue (e.g., goal, incident, problem, and/or opportunity) without dictating the particular way to reach the solution or resolution of the issue. A WR may include any number of objects that are data artifacts (e.g., business artifacts) that are made available for presentation and/or manipulation in the platform. A WR may also provide various functionality through the use of tools (described further below). Multiple users may access a WR through the platform. Accordingly, a WR may bring together the appropriate users to collaborate and resolve an issue, through conversation(s), ownership, delegation, and/or invitation In some implementations, the content and/or functionality of a WR is not predefined when it is created. The WR may be built in the course of the flow of the users and artifacts (e.g., data objects and/or tools) interacting with each other. As the WR develops, the platform may automatically create a record of changes to the WR and document the routines that led to the resolution of the issue. In some implementations, a WR is persisted in a single location from which it may be accessed by any suitable number of users.

Traditional systems may dictate the relationship between the issue and its solution, e.g., by providing only one or a predetermined limited number of ways to solve a particular problem. However, different users within an organization may have different preferred approaches for resolving a particular issue. Different users may use prefer to use different tools, different functionality, or different types of data. Different users may also prefer to collaborate with a different set of other users. For example, users within an organization may be faced with an issue to resolve, the issue being to fill open position in their organization. Two different teams may work to fill the position. The first team may approach the problem by looking for specific skills of candidates, and thus may add a "SkillFinder" tool to their WR (tools are described further below). The second team may prefer a social networking approach for filling the position, and may ask various current employees if they know any possible candidates who would be a good fit for the position. The position may be filled using either approach, but the teams may use the platform to employ different tools, metrics, objects, and/or individuals to solve the problem according to their preferred approach. The platform supports such different approaches or styles among different users by enabling users to structure and resolve an issue according to their (e.g., personal) WR. The platform does not dictate a particular solution or process to reach a solution, as may be dictated by traditional systems. Moreover, the platform decomposes functionality and artifacts to make functionality and artifacts readily consumable within a WR, enabling issue resolution that is adaptable to particular user styles.

FIG. 1 depicts an example system for a collaborative platform 100, according to implementations of the present disclosure. The platform 100 may include a client runtime 102. The client runtime 102 may execute on client computing device. The client runtime 102 may include an application project 104 that may include a list and/or various overviews of WRs being viewed and worked on within a UI of the client runtime 102.

In some implementations, an application project 104 is an application that uses the platform 100 to produce a client UI. The platform 100 supports applications with a variety of functions and/or look and feed, each of which may use the underlying platform 100. For example, the application may include the layout as shown in the examples of FIGS. 2 and 3, with the list of WRs in the left, a canvas page in the middle, and a provisioning area to the right. This arrangement may vary from application to application. WRs may be instances of concrete work stream activities, and the application project may provide a general class of possible WRs within this application. In another example, the platform may also support a more limited application in which all the functionality may take place in a single, centrally managed WR and/or which does not support the creation of new WR instances.

Although the example of FIG. 1 shows a single application project 104 in the client runtime 102, the client runtime 102 may include any appropriate number of application projects 104 at any given time. The application project 104 may include one or more project renderers 106, one or more project tools 108, and application code 110. Application code 110 may include JavaScript code, OpenUI5 code, and/or other types of code. In some implementations, the instances of renderers and/or tools that have been dragged and dropped on the canvass screen are stored in the Tool Service Persistence layer (e.g., the tool store 154). In some examples, the tool store 154 may store JavaScript code of those tools and/or renderers, and the code may be retrieved from persistence to enable the client runtime to execute the code. The app code 110 may represent custom application code which might enhance and/or modify the standard (e.g., unmodified) behavior of the platform 100. For example, drag and drop functionality may be provided within the platform 100 through the use of custom code in the app code 110. A mobile app might not use drag and drop but may instead provide other types of gestures by which the WR may be populated with objects. In some examples, the application project code 104 is stored within the hosted project 112 storage in the client runtime 102. The rounded-edged boxes in FIG. 1 represent persistent storage whereas the square edged boxes represent application components. In some implementations, the library 114 is a file which represents the complete framework including an object module 120, a rendering module 116, and so forth. The hosted project 112 may store the JavaScript files of the application specific code.

The client runtime 102 may include a library 114 that interacts with the application project 104. In some implementations, the library 114 is a JavaScript library that is an extension to OpenUI5, and/or OpenUI5 may be included in the library 114. The library 114 may provide JavaScript packages to enable drag and drop, visualization, renderers, and/or other UI functionality for the client runtime 102. The library 114 may also handles communications with other services such as the tool service 144 and the object service 128.

The library 114 may include a rendering module 116, a core module 118, an object module 120, a tool module 122, and a collaboration module 124. In some implementations, the library 114 may interact with a hosted library 126. The hosted library 126 may include JavaScript code that is running on the client device after it has been downloaded when the application is started. The rendering module 116 may provide a set of available renderers available for rendering objects within the client runtime UI, as described further below. The object module 120 and the tool module 122 may provide a set of available objects and tools to be added to a PWR through the UI. The object module 120 may also implement communication protocol(s) to read and/or write data in the object service 128. The collaboration module 124 may provide collaboration capabilities by storing and sharing some or all user actions and by interacting with the collaboration engine 152. The core module 118 may provide core functionalities such as application instantiation. As shown in FIG. 1, the interactions between the library 114 and the object service 128 may be realized through the object module 120 (e.g., acting as an intermediary). The rendering module 116 may interact with the project renderer(s) 106, and the object module 120 may interact with the project tool(s) 108 and the tool module 122. In some implementations, the tool module 122 may also interact with the project tool(s) 108.

The platform 100 may include a tool service 144. The tool service 144 may interact with a tool store 154, which provided persistent storage for tool information including any number of revisions of various tools available to be added to a WR by users of the platform 100. The tool service 144 may include a notification API 146, an application API 148, a tool API 150, and a collaboration engine 152. The notification API 146 may enable notifications (e.g., messages) to be sent between users of the platform 100. The tool API 150 may control which objects may be consumed by which tools. The collaboration engine 152 may enable collaboration between users by sending notifications (e.g., via socket I/O) to all clients interacting with a particular WR. Such notifications may enable state sharing within a WR, such that if one user makes a change to a WR the other users are able to view that change in real time. The application API 148 may provide one or more (e.g., special) functionalities that are reserved for applications, such as user management functionalities. An application may be described as a particular type of tool, and the application API 148 may provide direct communication capabilities between the application runtime and the tool service 144. In some implementations, the notification API 146 and/or application API 148 may interact with the application code 110. The tool API 150 may interact with the tool module 122, and the collaboration engine 152 may interact with the collaboration module 124.

The platform 100 may include an object service 128 that interacts with the client runtime 102. The object service 128 may include a metadata provider 130, a configuration REST controller 132, and a mapper 134. The mapper 134 may include a data (e.g., OData) client 136, a response mapper 138, and a request mapper 140. The object service 128 may interact with one or more source services 156 that are external to the platform 100. In implementations where the handled data is OData compliant, the source service(s) 156 may each include a OData service implementation 158. The source service(s) 156 may interact with one or more source object stores 160 that store the actual data for the data objects rendered in the client UI. In some implementations, any object that exposes an OData contract may be consumable by the platform 100 as a normalized object.

The annotations 142 may be stored in persistent storage that is accessed by the object service 128. In some implementations, an annotation for an object or an object type may include a mapping according to the normalized object contract. The annotation may indicate what attributes are included in the HeaderInfo and/or Identification. The annotation may also indicate which perspectives are supported by objects of a particular type. In some implementations, the annotations implicitly define a complete mapping from the source data model onto the normalized data model, where the latter is characterized by perspectives (e.g. HeaderInfo, Identification, etc.). In some implementations, there may be an annotation for each object type. An entity of data stored in a database has an associated annotation to enable the object to be consumed in the platform 100.

Although examples herein describe normalized objects being consumed by the platform 100, the normalized object exposure may be employed in other contexts as well. For example, other clients (e.g., OData clients) may consume the normalized objects to provide various application functionality. Implementations also support data formats other than a version of the OData standard.

In some implementations, the object service 128 may operate as a middle layer between the client runtime 102 and the source service(s) 156. The object service 128 may identify the most important and/or relevant fields and determine how they relate to connect to one another in the WR. Associations between normalized objects may be determined by the object service 128. For example, a company object may include an attribute that is a contact individual, and the object service 128 may determine the appropriate association between the company object and the person object for the contact person.

An object may be an arrangement of one or more portions of data accordingly to any suitable format. Implementations support various types of objects that include various types of information. For example, objects may include information that describes employees, invoices, materials, products, and/or other entities relevant to the operation of an organization. An object may be simple, such as an object that describes a particular user with attributes including name, title, address, telephone number, email address, location, and so forth. An object may also be more complex. For example, a sales order object may include, or link to, information describing the product sold, the number of items sold, the characteristics of the items, the buyer, the seller, the purchase date/time, purchase location, delivery status, price, and so forth. As an even more complex example, an object may describe a sales order for a nuclear power plant, that includes potentially hundreds of thousands of items on the sale order, the items as small as individual connectors on a control panel and as large as cooling tower structures. In some instances, an object is not a static document, but a dynamic data object for which the data may change based on actions performed by users and/or processes. An object may also have links to data in many other objects, which may themselves include data that is changing dynamically. Implementations provide a framework that enables the manipulation of dynamic objects through use of normalized object exposure and a normalized object contract, and such objects may exhibit any degree of complexity.

Dynamic actions may include actions that can be automatically executed, without requiring human input and without any intentional delay, taking into account the processing limitations of the computing system(s) performing the actions and the time needed to perform the actions. Dynamic actions may also be described as actions performed in real time.

Implementations provide for normalized object exposure, for artifacts (e.g., data objects and/or tools) that are supported in the platform. In some implementations, the platform exposes and enriches objects in a manner that allows users and/or applications to consume the objects in a standardized way. A consumption standard may regulate the exposure and consumption of objects. In some instances, the standard includes normalization of objects and metadata enrichment for use of the objects in user interfaces (UIs). Within the platform, the objects may be consumed by WRs, tools, and/or applications in a standardized manner. In some implementations, metadata enrichment of objects may employ one or more perspectives provided for the objects. A perspective may define a view, e.g., a set of attributes, on an object which expresses a usage of the object in a UI, such as the UI of the platform. A perspective may also semantically structure an object. To normalize different objects, implementations may provide a normalized object contract with which objects are to comply. The contract may define a set of perspectives that an object is required to expose. For example, as described further below, an object may be required to expose the HeaderInfo, Identification, LineItem, and SearchScope perspectives if the object is to participate in the framework.

Implementations provide a normalized object contract to provide normalization of objects and normalized object exposure. The contract may be described as an application programming interface (API) that is used to enable interoperation between objects, between objects and tools, and/or between objects and the platform. The contract may enable shared and/or common usage and consumption of an object. The contract may define a set of axioms that a normalized object is to conform with. Such axioms may include a requirement that a normalized object expose or otherwise provide a unique self-reference in the form of an identifier. The self-reference may include a uniform resource locator (URL) or other identifier that uniquely identifies a normalized object and allows the object to be retrieved and/or referenced among a plurality of objects. In some implementations, the self-reference is a unique identifier that is a combination of an instance key (e.g., particular to an instance of an object) and a structure or path to the type of the object. Such a path may be a URL.

The axioms may also include a requirement that the normalized object have a type, which defines a semantic interpretation of the normalized object. However, in some instances a semantic interpretation may not necessarily be linked to a single normalized object type. In some instances, a particular semantic interpretation may be associated with multiple object types. In some implementations, types may be inherited between objects. In some examples, object types (e.g., classes) can share attributes and/or functions with inheriting object types which may then enhance specific attributes and/or functions compared to the inherited attributes and/or functions. This enables the development of tools with respect to the super-class of object types. For example, certain actions might be possible on all objects of type "person," as well as sub-types of the person type. Therefore, a person finder can be implemented against the standardized contract of that parent object type. A more specific object type "employee" may extend "person" to provide more specialized functionalities and/or attributes such as salary, job level, hire date, and so forth. As another example, the (e.g., OData) data model which is generated by the object service may define an entity type "Thing" that includes the four mandatory perspectives (e.g., implemented as OData complex types). Every other object (or entity) type may be derived from the type "Thing" and thus inherits the contract and the four perspectives.

The axioms may also include a requirement that a normalized object represent a common, shared state to all the users and/or applications that are accessing or viewing the object at any particular time. Accordingly, multiple users and/or application referencing or retrieving the same object self-reference may also cause the reference and/or retrieval of the same normalized object and the same, common state for the object among all the accessors. Changes to an object may be propagated to all accessors in real time.

A normalized object may have any suitable number of perspectives, each of which provides a different view into the data of an object. Each perspective may have a name. Objects of a particular type may have one or more particular perspectives (e.g., the four mandatory perspectives and zero or more optional perspectives), and the perspectives provided by a specific type of object are defined in the annotation of that object type. The annotation may also define the structure and/or the semantic interpretation of the perspective. Each annotation may define perspectives for a type. Perspectives can also be defined (e.g., globally) through the contract (e.g., as the mandatory perspectives). A normalized object may include any number of optional perspectives in addition to the mandatory perspectives. Examples of such optional perspectives include a Geolocation perspective that exposes a location of the object in the form of coordinates (e.g., latitude and longitude, altitude), an address, or other location format. Such a perspective may be optional given that it may be relevant to some types of objects but not others. For example, a person object may have a location that is the home address, work address, and/or current location of the person, but may not be relevant to some other types of objects such as an image object (which may not be associated with a particular location). As another example, a DeliveryStatus perspective may be relevant to a delivery object, but not relevant to other types of objects such as a person object.

The contract may include an axiom that requires a normalized object to support one or more particular mandatory perspectives. In some implementations, the mandatory perspectives include the HeaderInfo, Identification, LineItem, and SearchScope perspectives. The structure and/or semantic interpretation of perspectives may be defined in the Vocabulary. The vocabulary may be described as a central namespace that includes any number of terms, where each term is a named metadata definition. For example, a vocabulary may provide a description of what is meant by the term "HeaderInfo," and annotations may then map the definitions of the terms to the various types of objects. In implementations that support OData, a vocabulary be correspond to the vocabulary that is a feature of a version of the OData standard. A vocabulary may define the types of annotations that can be used together with OData metadata and/or payload. Implementations may extend the OData vocabularies to add additional definitions. Code Example 1, below, provides an example of a vocabulary that may be employed in various implementations.

Code Example 1

```
<?xml version="1.0" encoding="UTF-8"?>
<!-- Copyright © 2015 SAP SE. -->
-<edmx:Edmx xmlns:edmx="http://docs.oasis-open.org/odata/ns/edmx" Version="4.0">
-<edmx:Reference Uri="http://docs.oasis-
open.org/odata/odata/v4.0/cs01/vocabularies/Org.OData.Core.V1.xml">
<edmx:Include Alias="Core" Namespace="Org.OData.Core.V1"/>
</edmx:Reference>
-<edmx:DataServices>
-<Schema Alias="Medas" Namespace="com.sap.vocabularies.Medas.v1"
xmlns="http://docs.oasis-open.org/odata/ns/edm">
<Annotation String="Terms for Medas Thingification" Term="Core.Description"/>
<Term AppliesTo="EntityType" Type="Edm.String" Name="EntitySetTitle"/>
-<Term AppliesTo="EntityType" Type="Medas.HeaderInfoType" Name="HeaderInfo">
<Annotation Term="Medas.ThingPerspective"/>
</Term>
-<ComplexType Name="HeaderInfoType">
<Property Type="Edm.String" Name="TypeName" Nullable="false"/>
<Property Type="Edm.String" Name="TypeNamePlural" Nullable="false"/>
<Property Type="Edm.String" Name="TypeImageUrl" Nullable="true"/>
<Property Type="Medas.DataField" Name="Title" Nullable="false"/>
<Property Type="Medas.DataField" Name="Description" Nullable="true"/>
<Property Type="Edm.String" Name="ImageUrl" Nullable="true"/>
</ComplexType>
-<Term AppliesTo="EntityType" Type="Medas.DataFieldCollectionPerspective"
Name="Identification">
<Annotation Term="Medas.ThingPerspective"/>
</Term>
-<Term AppliesTo="EntityType" Type="Medas.DataFieldCollectionPerspective"
Name="LineItem">
<Annotation Term="Medas.ThingPerspective"/>
</Term>
-<ComplexType Name="DataFieldCollectionPerspective">
<Property Type="Collection(Medas.DataField)" Name="Collection" Nullable="false"/>
</ComplexType>
-<Term AppliesTo="Property" Type="Edm.String" Name="CustomPerspectiveName">
<Annotation String="The name assigned to a complex property that represents a custom
perspective" Term="Core.Description"/>
</Term>
<Term AppliesTo="EntityType" Type="Collection(Medas.CustomPerspective)"
Name="CustomPerspectives"/>
<Term AppliesTo="Term" Type="Core.Tag" Name="ThingPerspective" DefaultValue="true"/>
-<ComplexType Name="CustomPerspective" Abstract="true">
<Annotation Term="Medas.ThingPerspective"/>
</ComplexType>
-<ComplexType Name="ReferencePerspective" BaseType="Medas.CustomPerspective">
<Annotation String="References a thing perspective." Term="Core.Description"/>
<Property Type="Edm.String" Name="Label" Nullable="true"/>
<Property Type="Edm.AnnotationPath" Name="Target" Nullable="false"/>
</ComplexType>
-<ComplexType Name="StructuredPerspective" BaseType="Medas.CustomPerspective">
<Annotation String="A thing perspective whose structure is defined at annotation level. The
resulting complex type must not contain any properties other than simple (primitive) properties."
Term="Core.Description"/>
</ComplexType>
-<Term AppliesTo="Property" Type="Core.Tag" Name="ThingReferenceCollection"
DefaultValue="true">
<Annotation String="Properties annotated with this term contain Thing URIs."
Term="Core.Description"/>
<Annotation String="Edm.String" Term="Core.RequiresType"/>
</Term>
-<ComplexType Name="DataFieldAbstract" Abstract="true">
<Property Type="Edm.String" Name="Label" Nullable="true"/>
</ComplexType>
-<ComplexType Name="DataField" BaseType="Medas.DataFieldAbstract">
<Property Type="Edm.PrimitiveType" Name="Value" Nullable="true"/>
<Property Type="Collection(Edm.String)" Name="Links" Nullable="true"/>
```

```
</ComplexType>
</Schema>
</edmx:DataServices>
</edmx:Edmx>
```

The HeaderInfo perspective may expose the one or more attributes of an object that have been determined to provide a brief description of the object. The HeaderInfo perspective may expose the type of an object and the self-reference (e.g., unique identifier) of the object. In some implementations, the HeaderInfo perspective may be (e.g., strictly) structured to expose a particular set of attributes (e.g., type, self-reference, etc.) according to a particular format.

The Identification perspective may expose the set of attributes that are exposed by the object. Accordingly, the Identification perspective may be used to determine what attributes are available in an object. In some implementations, the Identification perspective exposes those attributes that have been identified as key attributes for an object of a particular type. The Identification perspective may provide a semantic description of the type of an object.

The LineItem perspective may expose a set of line items that are included in the data of an object. This perspective may be employed, in some scenarios, for filtering, sorting, and/or arranging the object data in a table.

The SearchScope perspective exposes the attributes of an object that are searchable fields, e.g., that are useable for searching among multiple objects for particular object(s) that match a search query.

To provide a unified object exposure that is useable in the context of developing applications, implementations may provide a class that provides appropriate functionality for unified object exposure. In some implementations, the class may be part of a UI model, framework, and/or library such as the OpenUI5 application framework. In some implementations, the platform supports tools that can consume normalized objects. An object may also consume and/or reference other objects. The current JavaScript Object Notation (JSON) model implementation of OpenUI5 does not support forward navigation to other objects and/or models. Accordingly, implementations may extend the OpenUI5 model by introducing an object-aware object model class.

In some implementations, the platform includes tools that provide functionality to enable users to modify data of objects. To support a wide variety of use cases, implementations employ a tool concept that regulates how functionality is brought into the WRs. Thus, a tool may be described as an encapsulated set of logic and/or functionality with a particular purpose. The purpose and/or functionality of a tool may be specific to a particular domain, e.g., to particular types of objects. For example, an org chart browser tool may enable an employee hierarchy (e.g., org chart) to be browsed in a particular context of a business organization, and may therefore be applicable to particular types of objects (e.g., employee objects). In some instances, the purpose and/or functionality of a tool may be broadly useable for a variety of object types, and may be applicable to many different types of objects. For example, a collecting tool may enable multiple objects to be collected into a list, graph, or other data structure. As another example, a comparison tool may enable multiple objects to be compared with one another to identify differences and/or similarities between object attributes.

A tool may consume (e.g., be linked to or associated with) one or more objects and the tool may handle the object(s) according the purpose or functionality of the tool. In some instances, tools encapsulate their functionality and separate it from the rest of the WR. In this way, implementations may ensure that adding functionality through additional tools does not invalidate the rest of the WR. Tools can be developed independently and may be checked into a tool repository, from which they can be added into WRs by the users of the platform.

In some implementations, a tool within the platform is a normalized object that complies with the normalized object contract. A tool may be described as a normalized object that includes logic and/or functionality in addition to or instead of data. As described further below, the platform supports renderers that determine how an object is to be presented in the UI of the platform based on the type and/or relevant perspective of the object. In some implementations, renderers may not differentiate between objects and tools when presenting content in the UI. Instead, renderers may determine the semantic properties (e.g., type) of the object and/or tool that is to be rendered, and render the object and/or tool based on the semantic properties. Because tools comply with the normalized object contract like the other normalized objects within the platform, tools may consume other tools as well as consume objects. Accordingly, implementations may support definitions of renderers, tools, and/or WRs that are to some degree generic or specific depending on the particular context.

Implementations support the versioning of tools as well as the versioning of states of tools. Tools may be defined in terms of their semantic interpretation, the functionality they provide, and the structure of their state. The state of a tool may be a platform-independent manifestation of an instance of the tool. Further, the definition of a tool may be distinct from its technology-specific implementation and/or its visual representation. Because tools satisfy the normalized object contract, the tools may represent a common, shared state that is independent of the client runtime environment. Accordingly, the shared state of a tool may be accessed from different application implementations, for example in a mobile application in native iOS code and a web based application in JS/UI5 code. The platform specific implementations of tools may follow the tool definition, but may not necessarily define the tools. For example, an approval tool may be defined semantically to consume two objects: the instance of the to-be-approved object and an instance of the approving instance (e.g., employee). This definition of the approval tool may be globally true for all platform specific implementations of the tool. This may ensure that an execution of an approval in a web based JS/UI5 implementation can also be consumed from a native IOS application. The platform independent definition of tool functionality also allows for cross-platform collaboration which would otherwise not be possible.

The usual lifecycle of a tool may include updates, fixes, and/or the addition of features. When a tool changes, the platform-specific implementations on the client side may not necessarily implement the tool definition anymore. On the client side, each tool instance may include its state (e.g., retrieved from the tools self-reference) and an instance of a platform-specific implementation of the tools functionality (e.g., retrieved from the Tool Repository). When the definition of a tool changes due to an update, fix, or added feature, the stored state and the tool implementation(s) may also change. Accordingly, on the client side, a particular tool implementation may not correspond to the tool state and/or the tool definition. To address this issue, implementations include a versioning system for tools that allows the decoupled versioning of tool definitions and their platform-specific implementations. In some implementations, tool definitions may be versioned for major releases but not for minor releases or revisions. In some implementations, every release of a tool may be described as a major release, and the system may not support minor releases or minor revisions. A major version of the tool definition may indicate that upwards and/or downwards compatibility is not guaranteed for other versions of the tool. However, the platform specific implementations of tools may be versioned according to a major-minor-patch pattern. In such instances, the major release number of the tool implementation may indicate which tool definition version it implements. The implementation may thus be guaranteed to be compatible with the version of the tool definition (e.g., the tool state), and arbitrary, decoupled updates of the tool implementations may be allowed across client platforms.

In some implementations, client runtimes can download the implementations for each version of each tool from the tool repository. Client runtimes may also download the various versions available for renderer implementations from the renderer repository. In some implementations, the tool repository and/or renderer repository may be central entities that serve clients runtimes the requested tool and/or renderer implementations respectively. In some implementations, the tool repository may be present in the platform in addition to the tool service. The tool service 144 and/or the library 114 may access and communicate with the tool repository. In some examples, the tool repository may have its own persistence that stores tool definitions and/or versions.

The platform may render objects and/or tools in the UI of the platform for presentation to users. The platform may render any object in the UI, so long as the object supports the normalized object contract. Objects may be rendered according to a perspective. For example, an object rendered according to the Geolocation perspective may present its location, whereas the same object rendered according to the Identification perspective may present other information (e.g., identification information). Accordingly, implementations provide for polymorph rendering of objects, in which the same object is presented differently in the UI depending on which perspective is being used to render the object. In some implementations, the platform supports multiple renderers and each renderer is associated with a particular perspective. For example, the DeliveryStatus renderer may render an object by calling into its DeliveryStatus perspective, the LineItem renderer may render an object by calling into its LineItem perspective, and so forth. Polymorph rendering may also be described as adaptive rendering, given that the presentation of an object may be adapted to the particular needs of the users accessing the WR, and such adaptation is achieved through use of different renderers to render the object according to different perspectives. A particular renderer can be written once and added to the platform, and that renderer may be applied to a variety of objects. Tools may also be rendered according to various perspectives, given that tools also support the normalized object contract and at least expose the mandatory perspectives.

Within the platform, the various renderers may each produce a visualization of an object which may be employed by one or more tools to present and/or manipulate the object data. Some renderers may visualize an object according to a particular aspect of the normalized object contract, such as the Identification perspective. A renderer that visualizes an object according to a mandatory perspective may be used to render any object and/or tool, given that all objects and tools comply with the normalized object contract within the platform.

During the use of the platform or any application that uses the normalized object exposure described herein, many decisions are made regarding user interaction, visual representation, modification of tool states, and/or communication with other system components. Such decisions may be application-specific. However, in many instances tools and renderers could may provide reasonable defaults that can speed up the development of new applications and allow for code re-use. For example, implementations may support a modified version of the strategy pattern. Whenever a user interaction, event, tool, and/or renderer requests a decision or action of any kind, all of the involved components may submit a strategy for that decision to a central decision mechanism provided by the application renderer. A strategy can include any number of runnable actions, values, and/or other information that the decision requires. The decision mechanism may then decide which strategy should be accepted. However, to allow for maximum flexibility, the decision mechanism may ignore all the submitted strategies and independently determine a different strategy to be used.

In some implementations, a layout hypergraph may be employed by the platform. The platform may store data about the visual representations currently being presented in the UI, and this data storage may not violate the principle that the state of each tool instance should be agnostic with regard to platform-specific implementations as well as visual representations. The stored data may include an indication of which renderers have been chosen by the system and/or by the user, as well as other renderer-specific information. In some implementations, the storage of the layout data may be modeled as a directed, acyclic, finite, and/or recursive hypergraph with a designated root node. Each node of that hypergraph may correspond to an object or a tool. The root node may be an instance of a tool type that extends the application class. Each hyperedge of the hypergraph may be a finite, ordered list of nodes, each of which resembles a path of references from the root node of the hypergraph to the object or tool for which to store the layout data. All of the hyperedges, including the associated layout data, may be stored inside the root node of the hypergraph, e.g., the application instance.

In some implementations, renderer wrapping may be employed by the platform. Some renderers enable the user to interact with the object that the renderer represents. Such interactions may include, but are not limited to, creating and deleting references, triggering actions, changing the visual appearance, filtering, sorting, and so forth. Some such interactions may be supported by multiple renderers. To allow for a high level of code reuse and visual coherency, implementations employ renderer wrappers. These containers may provide a unified look-and-feel for various different renderers without forcing the developers of a renderer to handle these features themselves. In some implementations, each renderer may be wrapped by a renderer wrappers.

Implementations support the use of different wrappers, which may be chosen and assigned through the application strategy system. The strategy system may identify which code is to be executed in certain user interactions, for example when the user drags a tool from the tool bar 314 shown in FIG. 3B and drops it on the canvas 310. When this action occurs there may be multiple possible reactions taken by the system and the application strategy system may determine the system's response. In some implementations, the tree of object references (e.g., a layout hypergraph) may be traversed backwards and each element may be "asked" if it has a strategy to deal with the situation (e.g., the particular user action). First, the leaf node (e.g., the object instance) is asked if it has a defined behavior for which renderer to choose given that user interaction. It may provide a default renderer that it always indicates to use. Then, the outer tool (e.g., the canvas) may be asked if it has a strategy for the same situation. If it has, that strategy may override that of the leaf node given that the outer tool is higher in the tree and has more semantic information on this state. Then, the application (e.g., containing the canvas for the WR) may be asked if it has a strategy for the situation. The application may check whether a strategy has already been provided by a lower-level instance and, if not, may provide a default behavior for which renderer to choose. This process may also support platform independence, given that a different renderer might be chosen on a mobile smartphone app on a desktop web application environment. The tool itself may not know that given that it is lower in the tree. The selected and assigned wrappers may be persisted through the layout hypergraph.

Traditionally, applications are constructed at design time with a static set of particular functionality. Accordingly, such applications may have a limited ability to reflect and adjust to the individual situation of the user and their work style. In contrast to this traditional approach, the platform enables the user to create a WR to address a particular issue, and the user's style or approach to the issue (e.g., the user's "flow") may determine which objects and/or tools might be useful to resolve issue. The platform may provide this flexibility without the need to develop or configure the UI in any particular way to address a particular issue. Thus, the WR of person A can look and feel somewhat differently from a WR of person B, even though they may be dealing with similar issues. Moreover, because tools may be bound to objects at runtime, the development effort may be further reduced with respect to the platform other applications. In particular, tools may be developed once and then adapted to particular content (e.g., objects) at runtime. For example, dragging employee object(s) to a table tool in the UI may cause the employee object(s) to be processed into an employee table by the table tool. This contrasts with a traditional system in which the employee table is hard-coded as a static feature of the application at development time.

The platform may bind object data to the application artifacts late (e.g., at runtime), because at design time of the application the developer may not know which objects will need to be bound to which tools. By binding tools to objects through the normalized object contract, implementations provide a generic way of binding which enables the late (e.g., runtime) binding. In some implementations, the runtime binding of objects to tools is facilitated within the platform because tools may be configured to interface with certain perspectives of objects, interact with certain types of objects, and/or support particular requirements. Moreover, this implementation of runtime binding enables lazy loading of only those parts of the original data source object that are required (e.g., those attributes being used by the tools) without loading the complete object.

In some implementations, WR templates are available to be employed within the platform. As described above, a WR is a collection of objects that is added by the WR by users. The objects may be bound to tools to facilitate the resolution of an issue. Given the flexible character of a WR, WR templates may be provided to guide users in creating new WRs. The templates may enable users to save predefined WRs in any state and share them with other users. Additionally, the platform may enable users to browse the stored WRs and templates and optimize them given certain criteria such as total execution time until status "done" and so forth. This gives users the possibility to search for already existing templates and best practices for their current work routine to address a particular issue.

In some implementations, the platform may access data objects from any suitable number of source services. In some implementations, the source services may provide data according to a version of the OData protocol. The data model of the platform may be dependent on the data models of its associated (e.g., OData) source services as well as source service annotations, where such annotations describe the mapping onto the various data model elements. The process of mapping requests and results between the platform and the external (e.g., OData) data sources at runtime may employ an efficient data structure to minimize the potential performance impacts. Implementations may employ a hierarchical class structure that is configured to achieve efficient traversal by shifting some or most of the computational load to initialization time when the source service data models and annotations are processed. The initialization of this structure may be triggered at initialization time of the platform or whenever an administrative action causes changes to the schema mapping.

In some implementations, data service metadata may be dynamically generated. For example, the OData version 4.0 specification requires any implementing producer services to expose their entity data model through a Common Schema Definition Language (CSDL) metadata document. The data model of the platform may be dependent on the data models of its associated (e.g., OData) source services as well as source service annotations. Accordingly, the platform data model may be generated dynamically at initialization time and may change at runtime. In some implementations, an algorithm is employed that processes the previously created data (e.g., OData) schema mapping data structure to produce the desired target entity data model which then is exposed in the form of a CSDL metadata document.

In some implementations, resource requests may be mapped onto source service queries. In some instances, resource requests to the platform may result in a response that includes the desired representation of the queried object. This may implicitly require the application of the data (e.g., OData) schema mapping. Whenever the platform receives a resource request, it may employ the previously initialized schema mapping data structure to construct a request Uniform Resource Identifier (URI) such as a URL or Uniform Resource Name (URN) for the respective (e.g., OData) source server. Once all the required data is retrieved, it may be mapped onto a schema compliant response and returned to the initial requester. The applied algorithm may minimize the volume of data transferred between the source services and the platform server by appending the appropriate projection and in-lining keywords to the constructed request URI.

In some implementations, the platform may cache and/or pre-fetch normalized objects and/or any objects that are related to these. Requesting the particular attributes of an object that are needed by a tool and/or perspective, instead of the whole object, may reduce the volume of transferred data. However, communication overhead may still grow large if multiple perspectives of an object are requested during a short period of time. Accordingly, in some implementations an increased request-response performance can be achieved, and a reduced data volume overhead can be achieved, by utilizing server-side caching, pre-fetching, and/or eviction strategies for normalized object perspectives.

Some implementations may provide for design time definition of object type specific search scope. Each type of object may include a specific subset of attributes. A full-text search implementation may be performed to identify a particular subset of relevant attributes that are to be included in the respective SearchScope of an object. In some implementations, a SearchScope perspective definition may be required for each object type. This particular perspective may function as a white list of any attributes that are expected to be included in a full text search. In some implementations, the definition may occur at design time through the respective (e.g., OData) annotation files for each source service and entity type.

As used herein, design time may refer to the time of development and/or annotation. Runtime may refer to when the code is executed. For example, search scope may be modeled at design time to enable the runtime execution to refer to it. If search scope is not provided at design time through the annotation, search may not be possible at runtime.

In some implementations, the relationship between certain objects may be defined. For example, the OData specification may enable a service to model relationships between OData entities of the same type or different types through Navigation Properties. These properties may be limited to the specific data model of their respective OData services. In some instances, relationships may be defined between entities that reside in different source services such as OData services. In some implementations, relationships may be defined between objects that are persisted across different (e.g., OData) source services at design time. The relationship between different object types may be defined at design time. For example, a sales order may have two entries. There may be two object types "sales order" and "order entry" and the relationship between the two (e.g., one to many) may be defined at design time. This may also happen in the "annotation" as described above. This can be achieved through the use of (e.g., OData) annotation files by indicating attributes that are in a relationship to each other that is analogous to a foreign key relationship in a relational database context. Such a relationship may manifest itself in the platform schema as a navigation property.

As described above, the platform enables real-time collaboration between users. The target workflows that are to be covered by WRs may reflect complex (e.g., thought) processes that are the result of multiple users working together to address an issue. Traditionally, people may tend to share information through various tools such as office products or social media. To provide a different way for people to work together, implementations provide a mechanism that enables collaborative data processing within the WRs on the actual normalized objects. Accordingly, the platform provides a collaboration feature within WRs to enable collaborative data processing on the actual normalized objects within the WRs. Using this feature, a user can invite other users as participants into their WR and then collaborate either asynchronously through save events, or live through a toggle button.

As users work on complex issues within a WR, that WR may also become a complex object as it grows during its life span. Objects may be added to the working canvas, tools may be applied to the objects or replaced, and different states of the tools may be saved. When adding collaboration on top of this, the state of a WR may become more complex. To address the potential complexity of WRs and tools, at least some implementations provide a way for users to browse through the history of their WRs and re-produce specific states of tools. This feature enables users to go through each persisted state of their tool and view its history. Additionally, the feature enables branching from a past point in time (e.g., previous state) to create a new state that is based on the old state.

Figure 2A:
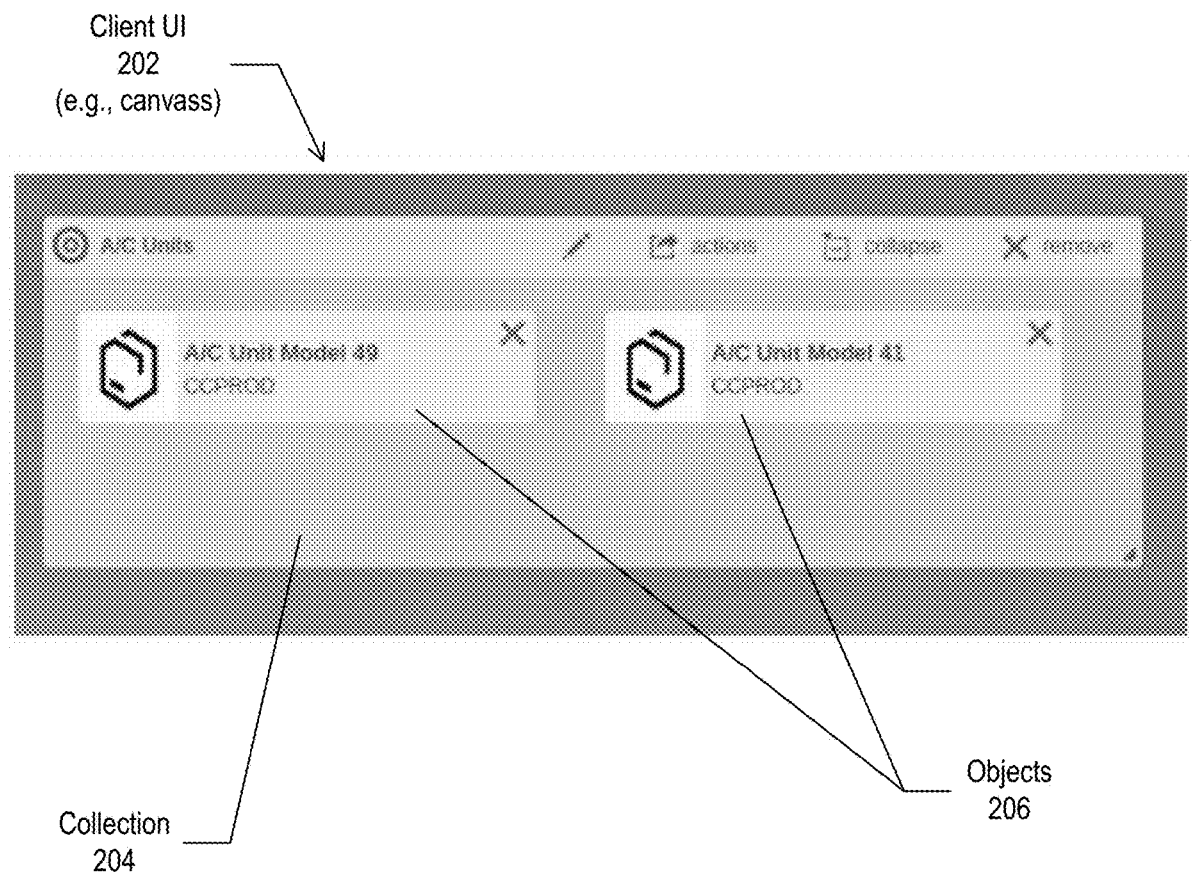
FIGS. 2A-2C depict an example client user interface, according to implementations of the present disclosure.
Figure 2B:
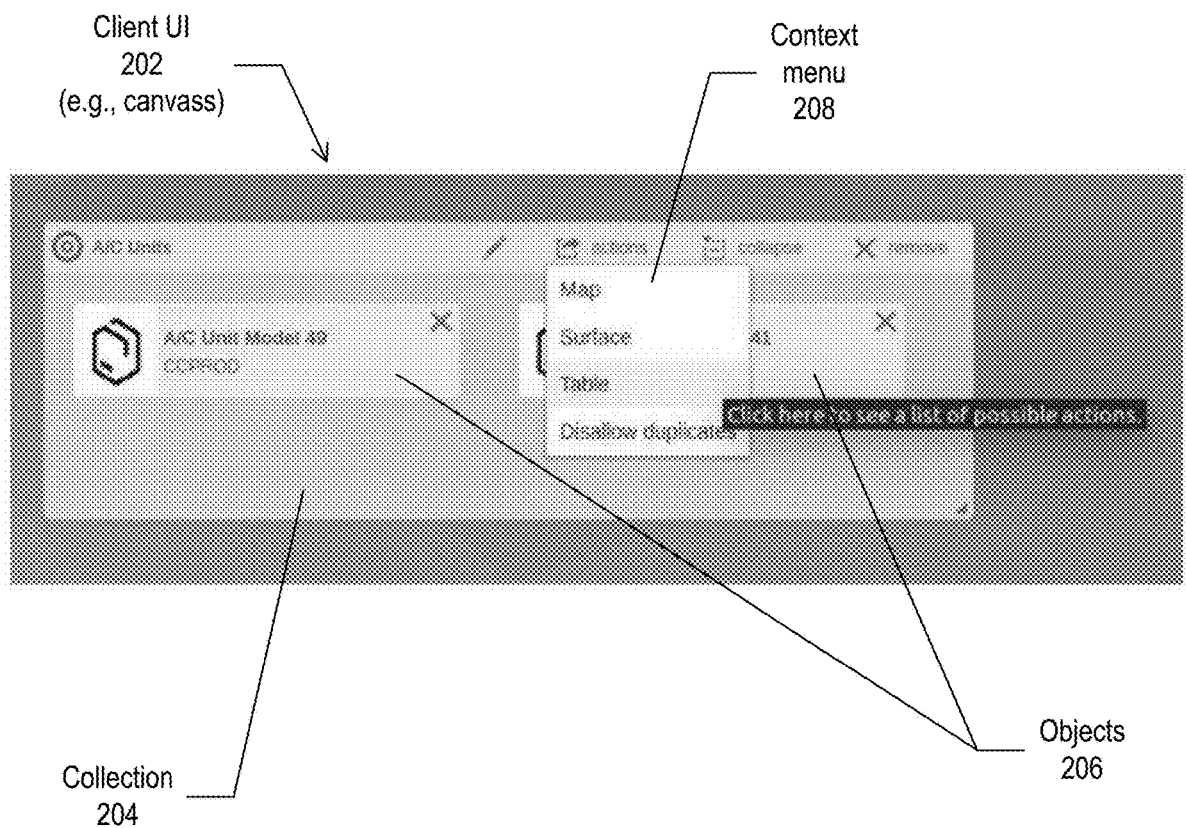
Figure 2C:
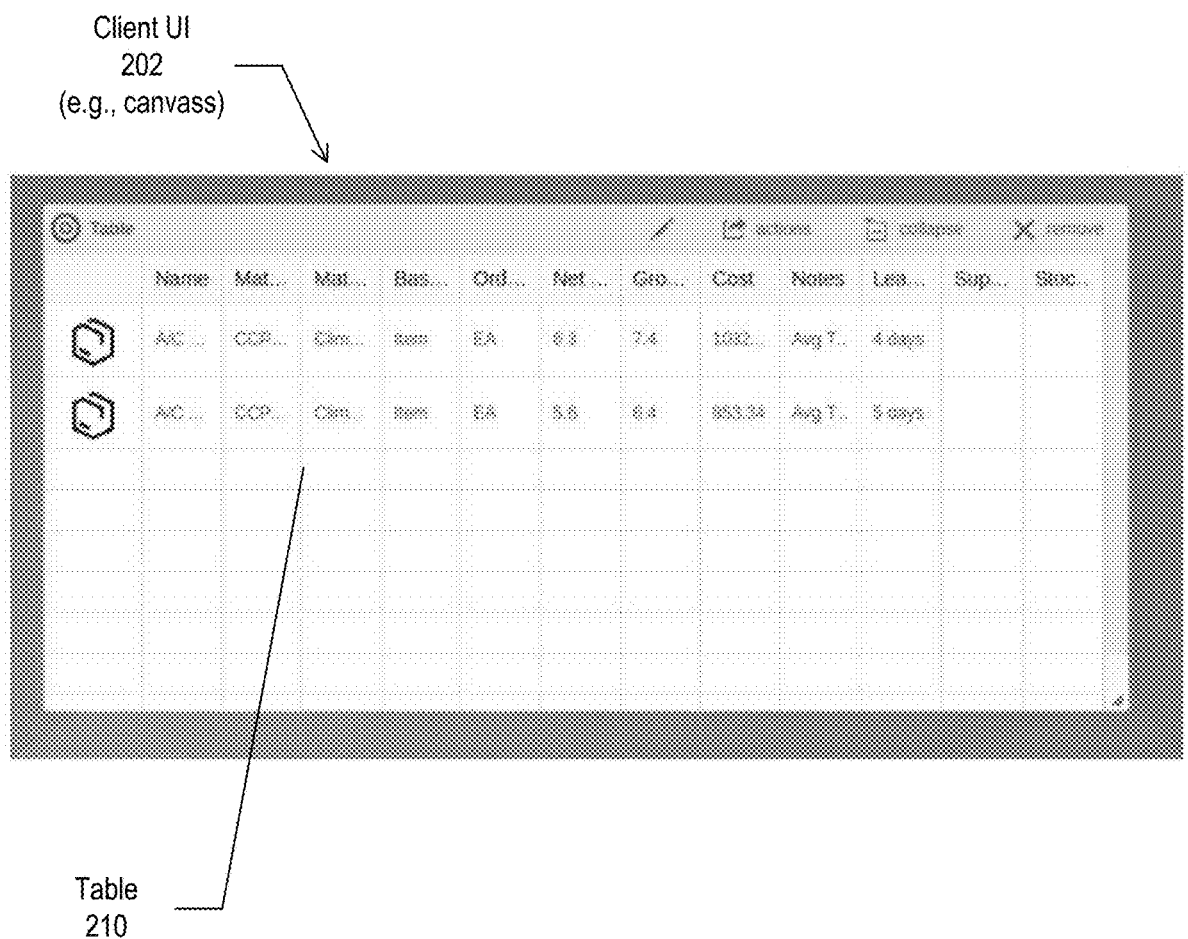

FIGS. 2A-2C depict an example client UI 202, according to implementations of the present disclosure. The client UI 202 may also be described as a canvass, and may be presented by the client runtime 102. Users may employ the client UI 202 to create a WR, add or manipulate objects within the WR, apply tools to objects, and so forth. As described above, the client UI 202 presents a shared, common state of the objects and/or tools in the WR, to enable multiple users to collaborate in resolving an issue using the WR.

Data binding is the mapping of visual artifacts of a UI to attributes of objects according to a model. Traditionally, data binding may be performed for each type of object that may be touched during execution of an application. For example, one object might expose the two fields "First Name" and "Last Name" whereas a similar, yet different object might have "First Name" and "Family Name". This semantic mapping of fields to the frontend application may consume a significant portion of the overall development cost of a project in a traditional software development setting.

In some implementations, renderers are employed to facilitate data binding. Renderers are entities that produce a visualization for objects and/or tools in the client UI 202. For example, a plain text renderer may present text describing the attributes of an object or tool. The same information (e.g., attributes of the objects or tools) can also be accessed and interpreted by polymorph renderers in the platform. For example, an Identification renderer may consume the Identification attributes of normalized object data and render the attributes it in a structured way for presentation in the client UI 202. Because the semantic interpretation of Identification is defined, the same renderer may work for every object or tool, given that all objects and tools expose Identification information to comply with the normalized object contract. A renderer may automatically display the different fields of different objects by addressing their normalized object model.

In some implementations, the polymorphism of renderers may work in various different ways. For example, the renderers are able to render information (e.g., structured in an object contract) for any object or tool without requiring a developer to write specialized code. Moreover, the renderers may be selected at runtime, and/or switched from one renderer to another at runtime, to alter the presentation of object data in the client UI 202. A description of which objects and/or tools are currently present in a WR, and which renderers are being used to visualize the objects and/or tools, may be persisted in data storage (e.g., in the tool information). Accordingly, a change in a renderer may change a single field in the tool model and may result in a different visualization for the users.

FIGS. 2A-2C depict an example of polymorph rendering based on normalized object exposure when switching the renderer for a group of objects from a collection renderer to a table renderer. In the example of FIG. 2A, the multiple objects 206 have been added to a WR for display in the client UI 202. A collection renderer has been selected to present a collection 204 of the objects 206. In the example shown, the collection 204 has a title "A/C Units" and include two different normalized data objects 206 for different models of A/C units.

In the example of FIG. 2B, a user has clicked on the "actions" control to see a list of possible actions that may be taken with regard to the collection 204. In response, the client UI 202 has presented a context menu 208 showing a selectable list of actions. In some implementations, at least some of the actions correspond to renderers that may be selected to present the objects 206 with a different view.

In the example of FIG. 2C, a user has selected the "Table" action to cause a table renderer to present the objects 206 in the form of a table 210. In this example, the same objects 206 have been presented in two different ways depending on the choice of a renderer, e.g., the collection renderer or the table renderer. Such polymorph rendering enables objects to be presented in various ways through selection of different ones of the multiple renderers available within the platform.

Figure 3A:
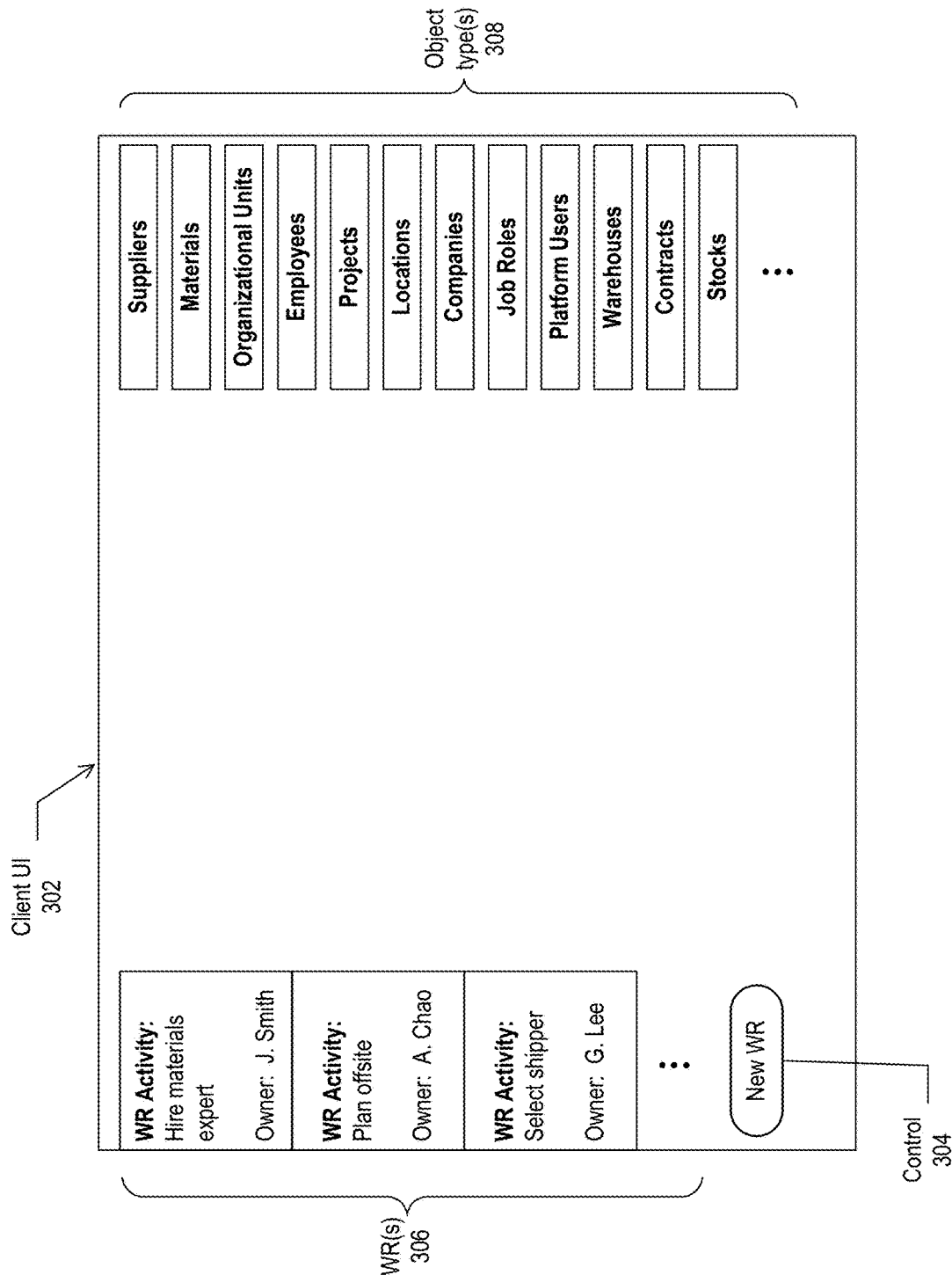
FIGS. 3A-3C depict an example client user interface, according to implementations of the present disclosure.
Figure 3B:
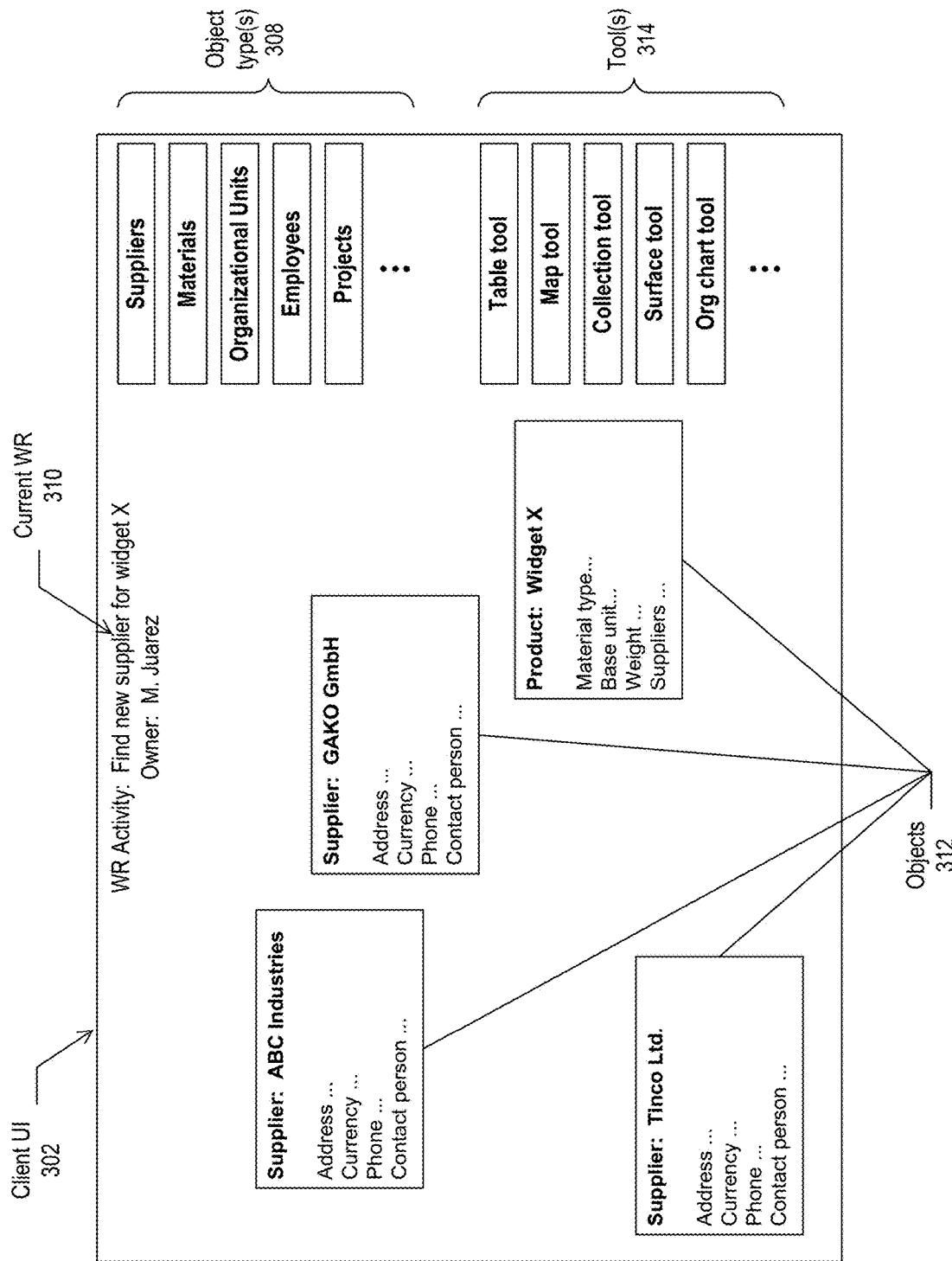
Figure 3C:
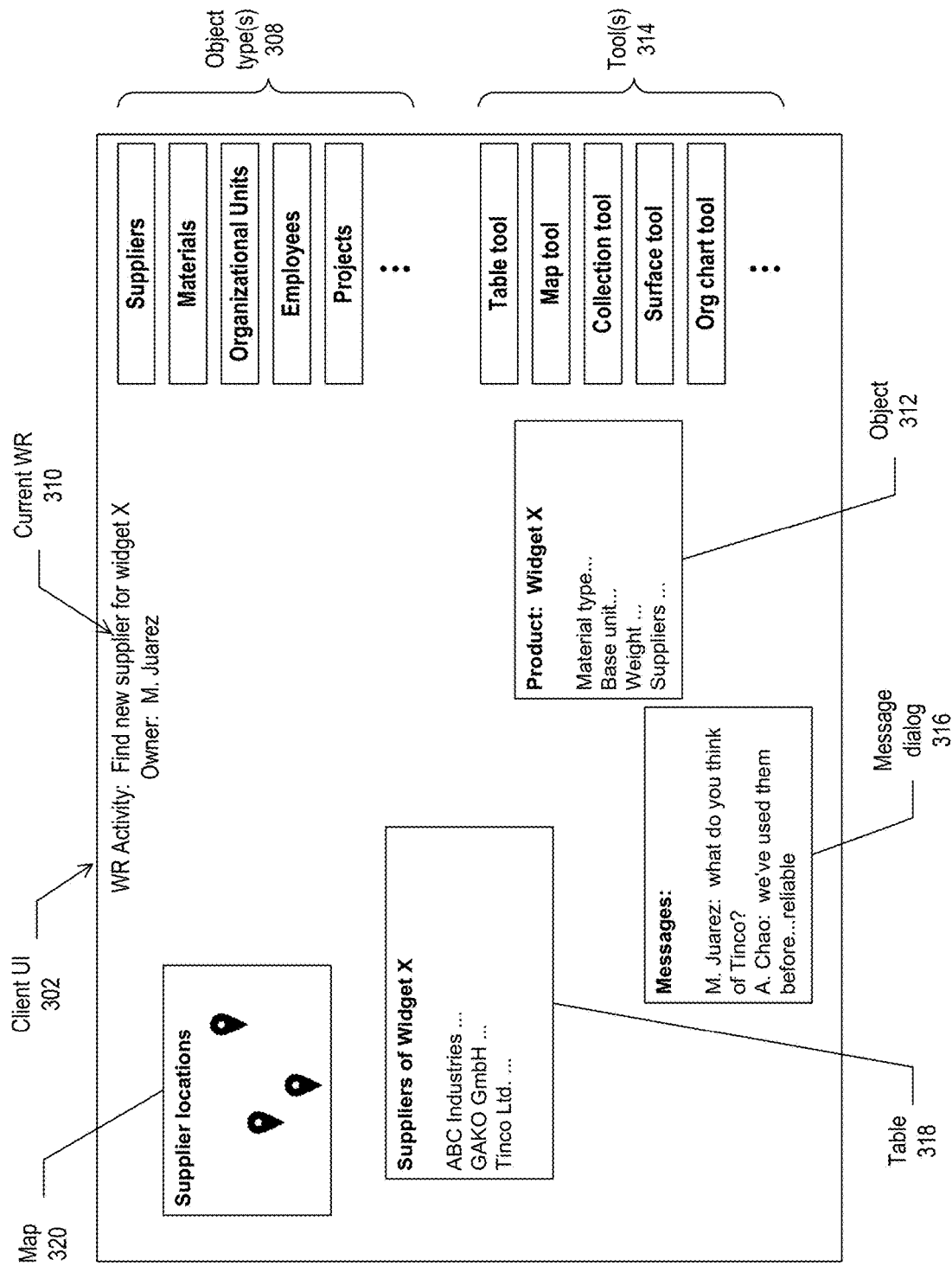

FIGS. 3A-3C depict another example of the client UI 302 that may be provided by the client runtime 102, according to implementations of the present disclosure.

As shown in the example of FIG. 3A, a user may view the client UI 302. The user may click or otherwise manipulate a control 304 to create a new WR in the client UI 302. In instances where WR(s) have been previously created and saved by the current user or other users, the client UI 302 may present a list of available WR(s) 306. The user may select one of the WR(s) 306 and work in that WR 306. The client UI 302 may also present a list of object types 308 that are available to be added to a WR, such as objects associated with suppliers, materials, organizational units, and so forth.

In the example of FIG. 3B, the current user (e.g., "M. Juarez") has created a new WR to facilitate collaboration among users to resolve a particular issue (e.g., finding a new supplier for a widget X). The client UI 302 may display information describing the current WR 310 being viewed and manipulated in the client UI 302. The current users and/or other users currently viewing the common, shared state of the WR may select various object types 308 from the available object types and add (e.g., drag and drop) objects into the WR. The added object(s) 312 may then be presented in the client UI 302 (e.g., the canvass of the WR). In the example shown, user(s) have added an object 312 for the particular product (e.g., the widget) for which a supplier is needed. The product object may be rendered according to its Identification or HeaderInfo perspective to present certain key attributes of the object such as the name, material type, base unit, weight, and suppliers. In some instances, a user may click on the suppliers attribute of the product object and bring up a list of available suppliers for the product. A user may then drag supplier objects into the WR for the various suppliers.

In the example of FIG. 3B, three possible suppliers have been identified for the product, and their objects 312 are rendered in the client UI 302 according to the Identification or HeaderInfo perspective. In some implementations, an object may be initially rendered according to a default renderer for a default perspective, such as the Identification perspective. The objects may be presented in the canvass according to the perspective, but the same perspective may cause different attributes to be presented for different types of objects. For example, as shown in FIG. 3B the supplier objects may be presented with address, currency, phone number, contact person, and/or other attributes that are relevant for a supplier. The product object may be presented with material type, base unit, weight, suppliers, and/or other attributes that are relevant for a product.

The client UI 302 may present a list of tools 314 available for use in the client UI 302. A user may select one of the tools 314 and add it to the canvass, e.g., by dragging and dropping the tool 314. A user may then drag various other objects onto the tool 314, to cause the tool to be applied to the object(s). In the example of FIG. 3C, a user has added the various supplier objects 312 into a table 318. A user (e.g., the same user or a different user) has also added the various supplier objects to a map 320, using the map tool. The map tool may present a visualization of the objects according to their location perspective. In some implementations, the client UI 302 may also present a message dialog 316 to enable the various users of the WR to send messages to one another. In some instances, the message dialog 316 is another tool that may be added to the WR by dragging and dropping it into the canvass.

The artifacts and functionality for a WR is created at dynamically in the client UI 302, e.g., at runtime, as various user(s) drag and drop objects (e.g., artifacts) and tools (e.g., for functionality) into the canvass. In some implementations, the client UI 302 may also present a details view for the WR, to enable user(s) to set a due date for resolving the issue, add participants who may view and manipulate the WR, and/or perform other actions with respect to the WR.

In some implementations, there may be no lines of code that a user needs to write in order to change the mapping from the fields of the objects to what is rendered in the client UI 302. The renderers may handle the rendering without any need of additional development. In this way, implementations may facilitate the visualization and manipulation of a WR by users who are not necessary engineers or developers.

Users may add various objects to the canvass, and then manipulate such objects by adding and/or removing links between objects. A link may indicate a relationship between objects. For example, a product object may have a link to a supplier object that identifies a possible supplier of the product. Users may explore the various data attributes exposed from the objects according to various perspectives. As shown in the examples of FIGS. 2A-2C, a user may select different perspectives to alter the visualization of the objects, through polymorphic rendering. A user may apply various tools to the objects, e.g., to dynamically apply logic or functionality to the object data. A tool may access object data through zero, one, or multiple perspectives. In the majority of instances, a tool may be configured to consume one perspective of an object.

As described above, the client UI 302 presents a common shared state for each of the visualized objects in the UI. For example, if the underlying data of an object changes while users are viewing the object in the client UI 302, the various different renderings of the object will also change accordingly. In this way, implementations provide dynamically alterable objects with data, in contrast to traditional document sharing systems that enable the sharing of static documents among users.

Any suitable number and type of tools may be available to manipulate object data and provide various different visualizations of object data. Such tools may include an audit tool and/or analysis tool to perform various auditing or analysis of the object data. Tools may also include an approval tool to seek approval from the various participants in the WR after a resolution to the issue to decided (e.g., a supplier is identified).

In some implementations, the current state of the WR is periodically saved to enable the WR to later be reloaded into the client UI 302. The current state may include the various objects that are currently being visualized, the perspectives being used to visualize the objects, the renderers in use, the participants, the tools that have been added, the associations between tools and objects, the associations between objects, and so forth. Implementations provide support for auditing changes made to the WR, e.g., by tracking user actions with respect to objects, tools, entity arrangement, selected perspectives, added fields, messages, and so forth. Implementations may enable a user to revert to a previous state of a WR.

The client UI 302 may enable users to add description to various fields of an object, e.g., a supplier rating, and/or add fields, e.g., quality, reliability, etc. Users may rearrange the objects in the canvass, and the rearranged view may be replicated for each of the current participants in the WR.

Figure 4:
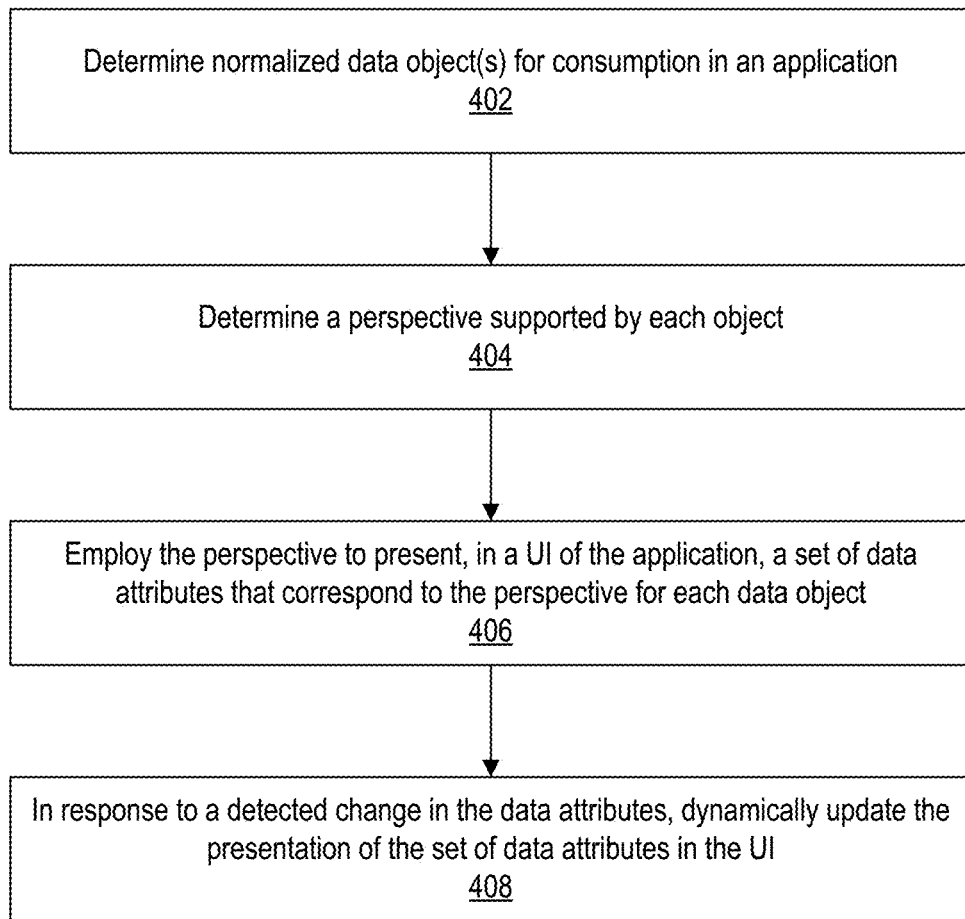
FIG. 4 depicts a flow diagram of an example process for presenting normalized data objects in a user interface of an application, according to implementations of the present disclosure.

FIG. 4 depicts a flow diagram of an example process for presenting normalized data objects in a user interface of an application, according to implementations of the present disclosure. Operations of the process may be performed by one or more of the client runtime 102, the tool service 144, the object service 128, the source service(s) 156, one or more sub-components of any of these, and/or other software modules executing on a client computing device, a server computing device, or elsewhere.

One or more normalized data objects may be determined (402) for consumption in an application, such as the platform 100. In some instances, the objects may be determined based on user inputs to a UI such as the client UI of the platform 100. For example, a user may drag and drop an object into the canvass of the client UI to add the object to a WR. Implementations also support the use of normalized data objects in applications and/or contexts other than the platform 100 described herein.

A perspective may be determined (404) to be used to present each of the object(s). In some instances, the perspective may be default perspective such as one of the mandatory perspectives defined by the normalized object contract.

The perspective may be employed (406) to present, in the UI, a set of data attributes that correspond to the perspective. In some instances, a renderer may be employed to present the object according to the perspective. The renderer may be configured to present a particular set of data attributes of the object. The render may also be configured to present the set of data attributes according to a particular arrangement. For example, a map renderer may present location attributes for objects on a map, whereas a table render may present attributes for objects in a table or list form.

In response to a detected change in the data attributes for the presented object, the presentation may be dynamically updated (408) to reflect the changed data attributes. This change may be reflected in all of the visualizations of the data object in various UI instances of the platform, according to the shared common state of the object(s) as described above.

Figure 5:
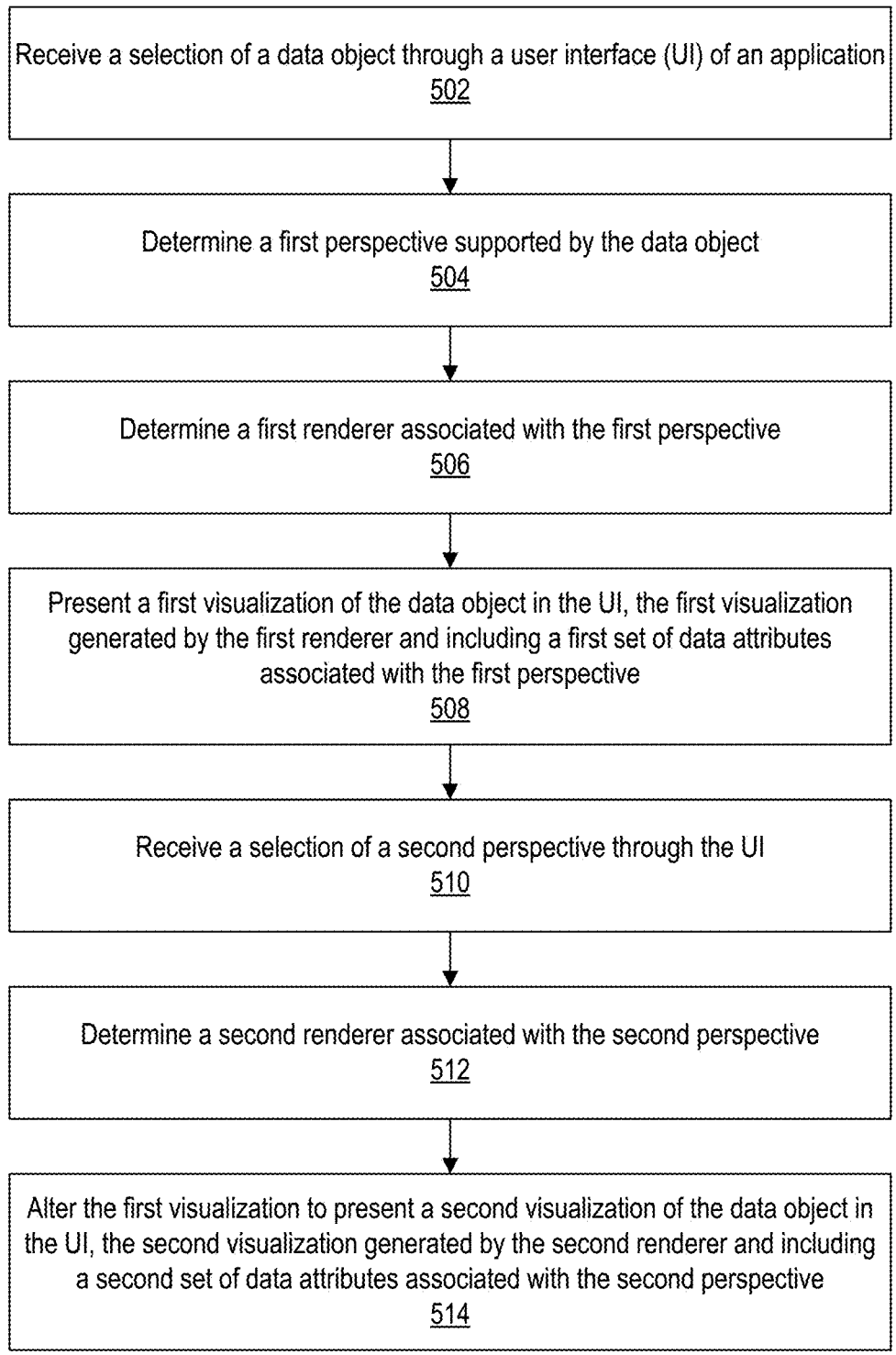
FIG. 5 depicts a flow diagram of an example process for polymorph rendering of normalized data objects in a user interface of an application, according to implementations of the present disclosure.

FIG. 5 depicts a flow diagram of an example process for polymorph rendering of normalized data objects in a user interface of an application, according to implementations of the present disclosure. Operations of the process may be performed by one or more of the client runtime 102, the tool service 144, the object service 128, the source service(s) 156, one or more sub-components of any of these, and/or other software modules executing on a client computing device, a server computing device, or elsewhere.

An indication may be received (502) of a data object selected through a UI of an application, such as the client UI of the platform 100. A first perspective may be determined (504), the first perspective supported by the object. In some instances, the first perspective may be a default perspective to be used for presenting a visualization of the object, as described above. The default perspective may be one of the mandatory perspectives indicated by the normalized object contract. A first renderer may be determined (506) associated with the first perspective.

A first visualization of the object may be presented (508) in the UI. As described above, the first visualization may be generated by the first renderer and may include a first set of attributes associated with the first perspective. The first renderer may present the first set of attributes in an arrangement corresponding to the renderer. For example, a map renderer may present attributes (e.g., location) in a map, a table renderer may present attributes in table, an org chart renderer may present attributes (e.g., names and titles of employees) in an org chart, and so forth.

An indication may be received (510) of a second perspective selected through the UI. The second perspective may be different than the first perspective. In some instances, the first visualization may include a UI element (e.g., a drop down menu) to enable the user to select different perspectives for visualizing an object, as shown in the examples of FIGS. 2A-2C. The UI element may include those perspectives that are available based on the type of the data object being rendered. A second renderer may be determined (512) associated with the second perspective.

The first visualization may be altered (514) to present a second visualization of the object in the UI. The second visualization may be generated by the second renderer and may include a second set of the data attributes associated with the second perspective. In some instances, the second set of data attributes may be different from the first set of data attributes, and the second renderer may render the data attributes in a similar or different arrangement compared to the first visualization. In some instances, the second set of data attributes may be the same as the first set of data attributes, and the second renderer may render the data attributes in a different arrangement compared to the first visualization. Accordingly, renderers may render different attributes, a different arrangement of attributes, or different attributes in a different arrangement.

Figure 6:
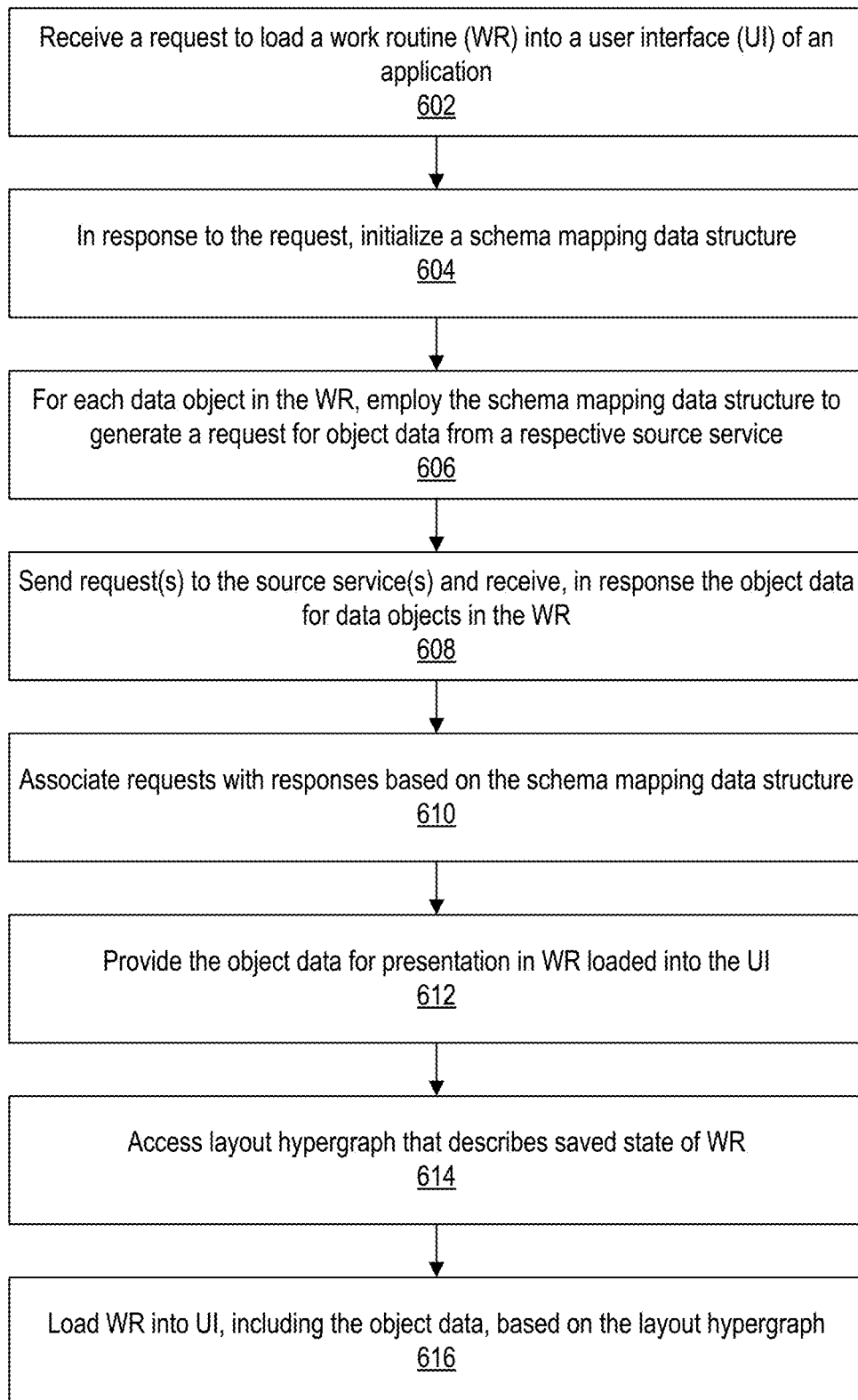
FIG. 6 depicts a flow diagram of an example process for determining object data for normalized data objects presented in a user interface of an application, according to implementations of the present disclosure.

FIG. 6 depicts a flow diagram of an example process for determining object data for normalized data objects presented in a user interface of an application, according to implementations of the present disclosure. Operations of the process may be performed by one or more of the client runtime 102, the tool service 144, the object service 128, the source service(s) 156, one or more sub-components of any of these, and/or other software modules executing on a client computing device, a server computing device, or elsewhere.

A request may be received (602) to load a WR into a UI of an application, such as the client UI of the platform 100. In response to the request, a schema mapping data structure may be initialized (604). For each data object to be loaded into the UI for a WR, the schema mapping data structure may be employed (606) to generate a request for the object data associated with the data object. The requests (608) may be sent to the appropriate source service(s) that provide the object data for each object to be rendered in the UI and, in response, the object data may be received from the source service(s). In some implementations, the schema mapping data structure may be employed to associate (610) requests for object data with the responses received from the source service(s).

The object data received from the source service(s) may be provided (612) for presentation in the WR loaded into the UI. In some implementations, loading the WR may include accessing (614) a saved state of the WR, saved in the form of a layout hypergraph as described above. The WR, including the received object data, may be loaded (616) into the UI based on a traversal of the layout hypergraph. In some instances, the schema mapping data structure may be reinitialized in response to detecting an administrative action that indicates a schema mapping change.

Below are several examples or use cases for using the platform to resolve an issue. These examples are non-limiting, and implementations support various other use cases for using the platform to resolve an issue. In a first example, a user may begin may creating an empty, new WR in the client UI to be used for organizing an office holiday party. The new WR does not yet include any artifacts (e.g., objects or tools). The WR is not yet embedded in any context or application, so that the user may use a search capability of the client UI to determine data sources (e.g., objects) and tools to add to the WR. The user may access a list of colleagues that are included in a "my team" list in the UI, and the user may add two colleagues as participants in the WR (e.g., users who may view and/or manipulate artifacts in the WR). The user may also use particular tools such as an expert finder to find an expert for holiday card designs. The user may also go to the generic search capability of the UI and look for available stage equipment for the internal band that colleagues formed especially for that occasion. The fleshing out of the WR, always described as provisioning, may be initiated by the user, and he may successively build the WR with data objects and tools.

Based on the current context of the user, the platform may automatically surface the appropriate activity or tool that matches the context. The platform may provide empty slots or placeholders for artifacts such as objects and/or tools, but not the artifacts themselves. For example, in a sales order fulfillment context the platform may automatically surface a "create sales order" template with a priori designed free slots for customer account, products, and/or quantities. The user can then provision these slots with artifacts that are displayed in the application context.

A similar example with the same or similar properties could be a delegation task. A user may wish to delegate a task to someone else. The platform may then automatically deliver a delegation template that shows placeholders for the delegation subject, the delegate and a free text form for comments. The user can then add an artifacts as subject and drag and drop a subordinate individual who will then be in charge of the subject. In these examples, the platform provides a skeleton in the form of empty slots for the user who then takes artifacts out of the application to fill the WR. The first example may reflect system-based provisioning, whereas the second example reflects user-based provisioning.

Another example of provisioning a WR can be found in cases of incident resolution, e.g. when a material shortage is detected by the system that currently interrupts a given supply chain. In such instances, the platform may bootstrap a WR and initially provide objects and/or tools to facilitate solution of the issue. In such instances, the platform may not only provide placeholders for artifacts but may pre-populate the placeholders with the artifacts themselves, such as but already things, such as alternative materials, alternative suppliers, and/or alternative routes to enable shipments of the material on a different route (if the usual route is blocked, for example). The platform may also instantiate the appropriate tools for decision making, e.g. a comparison and/or pro-/con-tool, so that the user can directly start solving the problem. In this example, the provisioning is triggered by an event and perform at least partly by the platform that initially provides a set of tools and/or objects for the user in the WR. The user can then work with these objects and/or tools, modifying and/or manipulating them as needed, to find a solution to the issue.

Figure 7:
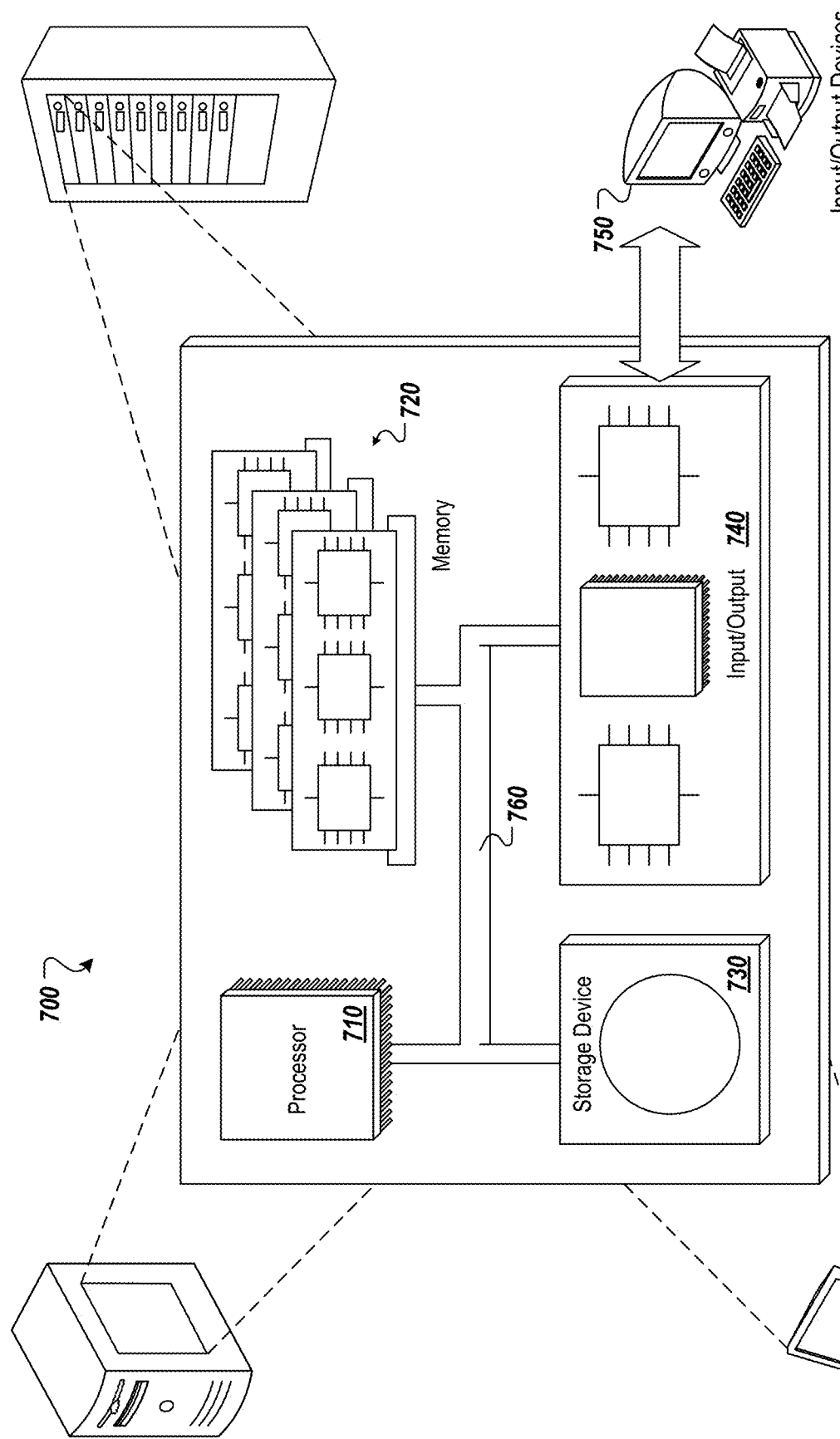
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in one or more computing device(s) that execute the platform 100, the client runtime 102, the object service 128, the tool service 144, the source service(s) 156, and/or other software module(s) described herein. The system 700 may include one or more processors 710, a memory 720, one or more storage devices 730, and one or more input/output (I/O) devices 750 controllable through one or more I/O interfaces 740. The various components 710, 720, 730, 740, or 750 may be interconnected through at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   determining, by the at least one processor, one or more normalized data objects and one or more normalized tool objects for consumption in an application executed by the at least one processor, wherein the one or more normalized data objects and the one or more normalized tool objects comply with a normalized object contract, wherein the normalized object contract specifies one or more perspectives that are supported by each of the one or more normalized data objects and by each of the one or more normalized tool objects, wherein each of the one or more perspectives provides access to a corresponding set of data attributes of the one or more normalized data objects and a corresponding set of tools of the one or more normalized data objects, wherein each of the tools is configured to consume at least one of the one or more normalized data objects, wherein each of the one or more perspectives corresponds to a different set of data attributes, and wherein the one or more perspectives contain one or more mandatory perspective and one or more optional perspectives; and determining, by the at least one processor, for each of the one or more normalized data objects and each of the one or more normalized tool objects, a respective perspective of the one or more perspectives that is supported by the respective object; and employing, by the at least one processor, the respective perspective to present, in a user interface (UI) of the application: i) the set of data attributes that correspond to the determined perspective for each of the one or more normalized data objects, and ii) the set of tools that correspond to the determined perspective for each of the one or more normalized tool objects.

2. The method of claim 1, wherein the one or more perspectives include one or more of a HeaderInfo perspective, an Identification perspective, a LineItem perspective, and a SearchScope perspective.

3. The method of claim 1, wherein the normalized object contract further specifies that the one or more normalized data objects each includes a self-reference that comprises an instance key and a path to an object type.

4. The method of claim 1, wherein the normalized object contract further specifies that the one or more normalized data objects each provide a shared common state to a plurality of accessors.

5. The method of claim 1, wherein the normalized object contract further specifies that the one or more normalized data objects each have a type.

6. The method of claim 5, wherein each of the one or more normalized data objects support one or more other perspectives according to the type.

7. The method of claim 1, further comprising:
in response to a change in at least one of the set of data attributes, dynamically updating the presentation of the set of data attributes in the UI.

8. A system, comprising:
at least one processor; and
a memory communicatively coupled to the at least one processor, the memory storing instructions which, when executed by the at least one processor, cause the at least one processor to perform operations comprising:
determining one or more normalized data objects and one or more normalized tool objects for consumption in an application executed by the at least one processor, wherein the one or more normalized data objects and the one or more normalized tool objects complying with a normalized object contract, wherein the normalized object contract specifies one or more perspectives that are supported by each of the one or more normalized data objects and by each of the one or more normalized tool objects, wherein each of the one or more perspectives provides access to a corresponding set of data attributes of the one or more normalized data objects and a corresponding set of tools of the one or more normalized data objects, wherein each of the tools is configured to consume at least one of the one or more normalized data objects, wherein each of the one or more perspectives corresponds to a different set of data attributes, and wherein the one or more perspectives contain at least one mandatory perspective and one or more optional perspectives; and
determining, for each of the one or more normalized data objects and each of the one or more normalized tool objects, a respective perspective of the one or more perspectives that is supported by the respective object; and employing the respective perspective to present, in a user interface (UI) of the application: i) the set of data attributes that correspond to the determined perspective for each of the one or more normalized data objects, and ii) the set of tools that correspond to the determined perspective for each of the one or more normalized tool objects.

9. The system of claim 8, wherein the one or more perspectives include one or more of a HeaderInfo perspective, an Identification perspective, a LineItem perspective, and a SearchScope perspective.

10. The system of claim 8, wherein the normalized object contract further specifies that the one or more normalized data objects each includes a self-reference that comprises an instance key and a path to an object type.

11. The system of claim 8, wherein the normalized object contract further specifies that the one or more normalized data objects each provide a shared common state to a plurality of accessors.

12. The system of claim 8, wherein the normalized object contract further specifies that the one or more normalized data objects each have a type.

13. The system of claim 12, wherein each of the one or more normalized data objects support one or more other perspectives according to the type.

14. The system of claim 8, the operations further comprising:
in response to a change in at least one of the set of data attributes, dynamically updating the presentation of the set of data attributes in the UI.

15. One or more non-transitory computer-readable media storing instructions which, when executed by at least one processor, cause the at least one processor to perform operations comprising:
determining one or more normalized data objects and one or more normalized tool objects for consumption in an application executed by the at least one processor, wherein the one or more normalized data objects and the one or more normalized tool objects complying with a normalized object contract, wherein the normalized object contract specifies one or more perspectives that are supported by each of the one or more normalized data objects and by each of the one or more normalized tool objects, wherein each of the one or more perspectives provides access to a corresponding set of data attributes of the one or more normalized data objects and a corresponding set of tools of the one or more normalized data objects, wherein each of the tools is configured to consume at least one of the one or more normalized data objects, wherein each of the one or more perspectives corresponds to a different set of data attributes, and wherein the one or more perspectives contain at least one mandatory perspective and one or more optional perspectives; and
determining, for each of the one or more normalized data objects and each of the one or more normalized tool objects, a respective perspective of the one or more perspectives that is supported by the respective object; and
employing the respective perspective to present, in a user interface (UI) of the application: i) the set of data attributes that correspond to the determined perspective for each of the one or more normalized data objects, and ii) the set of tools that correspond to the determined perspective for each of the one or more normalized tool objects.

16. The one or more non-transitory computer-readable media of claim 15, wherein the normalized object contract further specifies that the one or more normalized data objects each includes a self-reference that comprises an instance key and a path to an object type.

17. The one or more non-transitory computer-readable media of claim 15, wherein the normalized object contract further specifies that the one or more normalized data objects each provide a shared common state to a plurality of accessors.

18. The one or more non-transitory computer-readable media of claim 15, wherein the normalized object contract further specifies that the one or more normalized data objects each have a type.

19. The one or more non-transitory computer-readable media of claim 18, wherein each of the one or more normalized data objects support one or more other perspectives according to the type.

20. The one or more non-transitory computer-readable media of claim 15, the operations further comprising:
   in response to a change in at least one of the set of data attributes, dynamically updating the presentation of the set of data attributes in the UI.

\* \* \* \* \*